US006882460B2

(12) United States Patent
Tsu et al.

(10) Patent No.: US 6,882,460 B2
(45) Date of Patent: Apr. 19, 2005

(54) PHASE ANGLE CONTROLLED STATIONARY ELEMENTS FOR LONG WAVELENGTH ELECTROMAGNETIC RADIATION

(75) Inventors: David Tsu, Auburn Hills, MI (US); Robert O. Miller, Rochester, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 35 days.

(21) Appl. No.: 10/670,909

(22) Filed: Sep. 25, 2003

(65) Prior Publication Data

US 2004/0100343 A1 May 27, 2004

Related U.S. Application Data

(63) Continuation-in-part of application No. 10/226,828, filed on Aug. 23, 2002, now Pat. No. 6,768,666.

(51) Int. Cl.⁷ ................................................ G02F 1/01
(52) U.S. Cl. .................. 359/279; 359/240; 359/243; 359/290; 359/299; 359/321; 369/13.35; 369/284; 369/288; 257/2; 365/113
(58) Field of Search ............................... 359/279, 240, 359/243, 290, 299, 321; 365/112–114; 369/13.35, 284, 288; 257/2

(56) References Cited

U.S. PATENT DOCUMENTS

| | | | | |
|---|---|---|---|---|
| 3,661,441 A | * | 5/1972 | Uchida et al. | 359/311 |
| 3,920,461 A | * | 11/1975 | Asahara et al. | 501/40 |
| 5,299,054 A | * | 3/1994 | Geiger | 359/251 |
| 6,236,493 B1 | * | 5/2001 | Schmidt et al. | 359/296 |
| 6,452,710 B1 | * | 9/2002 | Hiraga et al. | 359/244 |
| 6,728,154 B1 | * | 4/2004 | Miura et al. | 365/215 |
| 6,768,666 B1 | * | 7/2004 | Tsu | 365/113 |

2003/0030519 A1  2/2003  Wyeth et al.

* cited by examiner

*Primary Examiner*—Evelyn A. Lester
(74) *Attorney, Agent, or Firm*—Kevin L. Bray; Marvin S. Siskin

(57) ABSTRACT

An element for reflecting, transmitting, focusing, defocusing or wavefront correction of electromagnetic radiation in the terahertz frequency range. The elements include a grid of conductive strips including active regions comprising a chalcogenide phase change material. The chalcogenide material can be in an amorphous, crystalline or partially crystalline state. The dispersive characteristics of the grid (e.g. impedance, admittance, capacitance, inductance) influence one or more of the reflection, transmission, state of focusing or wavefront characteristics of incident electromagnetic radiation through the action of a stored phase taper formed by establishing a crystallinity gradient over a series of active chalcogenide regions or domains in one or more directions of the element. The dispersive characteristics of the grid are determined by the structural states of the active chalcogenide regions contained therein and are reconfigurable through transformations of one or more chalcogenide regions from one structural state to another by providing energy to the chalcogenide material. In a preferred embodiment, the individual active chalcogenide regions are much smaller than the operating wavelength of the element so that a plurality of active chalcogenide regions is included in wavelength scale domains. In these embodiments, crystallinity gradients may be formed through monotonic increases or decreases in the domain average fractional crystallinity in one or more directions of an element where no particular requirement on the fractional crystallinity of individual active regions need be imposed. In these embodiments, the domain fractional crystallinity is a statistical average over the individual chalcogenide regions contained therein and phase tapers may be achieved in multi-state or binary mode. The element may be free-standing, supported on a dielectric substrate or interposed between two or more dielectric materials.

39 Claims, 15 Drawing Sheets

PHASE ANGLE CONTROLLED STATIONARY ELEMENTS FOR LONG WAVELENGTH ELECTROMAGNETIC RADIATION

CROSS-REFERENCE TO RELATED APPLICATIONS

The instant invention is a continuation in part of co-pending U.S. patent application Ser. No. 10/226,828, entitled "Phase Angle Controlled Stationary Elements for Wavefront Engineering of Electromagnetic Radiation" and filed on Aug. 23, 2002, now U.S. Pat. No. 6,768,666 B2; the disclosure of which is hereby incorporated by reference.

FIELD OF INVENTION

This invention relates to devices for controlling the direction of propagation and degree of focusing of electromagnetic radiation. More particularly, this invention relates to stationary elements that provide control over the reflection, transmission, focusing, and defocusing of long wavelength electromagnetic radiation. Most particularly, this invention relates to reconfigurable elements for modifying the phase of incident electromagnetic radiation in the terahertz frequency range of the electromagnetic spectrum.

BACKGROUND OF THE INVENTION

Interest in terahertz frequency systems has been steadily increasing over the past several years as their unique capabilities are identified and technological barriers to their realization are overcome. The terahertz frequency region (frequencies of ca. 0.3 THz and higher (corresponding to wavelengths of ca. 1 mm and shorter) offers a number of advantages including large bandwidths and a significant reduction in size and weight relative to existing microwave electromagnetic systems. Several applications that depend on or are expected to benefit from terahertz frequency technology have been proposed or are under development. These applications include spectroscopic detection of atmospheric pollutants (e.g. ozone, greenhouse gases) and chemical warfare agents, high resolution imaging systems for low visibility environments and optically opaque media (e.g. fog, smoke, night, concealed object detection), short-range communications systems and satellite crosslinks. Military applications of terahertz frequency systems include aircraft guidance systems, portable radars, missile seekers, and battlefield communications. Possible civilian applications include automotive collision avoidance systems, blind-spot indicators, freeway tolling, product tagging, and wireless communications.

Realization of terahertz frequency systems requires the development of new technologies for the transmission, manipulation and reception of electromagnetic radiation in the millimeter to sub-millimeter wavelength portion of the electromagnetic spectrum. For convenience, the millimeter to sub-millimeter wavelength portion of the electromagnetic spectrum may be referred to herein as the millimeter wavelength range. Traditional approaches have emphasized extensions of electronic technologies used in the radiofrequency (rf) range (frequencies from about 3 MHz to about 30 GHz, wavelengths from about 10 m to about 1 cm) to the terahertz frequency range. Electromagnetic radiation in the rf region has been utilized for many years in radar imaging and tracking systems and has a well-developed base of technology that includes elements for transmitting, steering, focusing and receiving rf radiation. Conventional rf technology is an electronic circuit based technology in which discrete electronic components such as capacitors and inductors are used to form transmission lines, waveguides, and phase shifters that are used to directly produce, control and detect rf radiation. Although conventional rf systems are generally compatible with millimeter wave applications, problems associated with cost, power and functionality arise, especially in the sub-millimeter range. Cost issues stem from the expensive phase shifters needed for the directional transmission or reception of rf radiation. Power issues arise in the context of active phase arrays, which utilize solid-state devices. The power handling capability of solid-state devices is frequency dependent and decreases with increasing frequency of electromagnetic radiation. The output power of a typical Si bipolar junction transistor, for example, decreases by over three orders of magnitude when the frequency is changed from 1 GHz to 30 GHz. Moreover, at sufficiently high frequencies, discrete electronic components (e.g. capacitors and inductors) lose their functionality.

Recent developments in millimeter wave systems have emphasized spatially based systems in which the radiation propagates in free space, rather than through circuits, waveguides or transmission lines. Spatially based systems are also referred to as quasi-optical systems because they treat millimeter wave radiation as free space beams and manipulate these beams in a manner analogous to methods used for manipulating optical beams. Quasi-optical elements can be used to amplify, mix, switch, reflect, transmit or phase shift millimeter wave beams. Quasi-optical elements can be passive or active. A passive quasi-optical element typically consists of a grid of a conducting material. The grid can be formed, for example, from a thin sheet of a conducting material that includes periodically spaced perforations. Wire grids are also possible. The grids can be free standing, mounted on a dielectric substrate, or sandwiched between two dielectric materials. Active quasi-optical elements incorporate a periodic array of active (non-linear) devices into an otherwise passive grid. The active devices can be placed at the intersection points of a grid or between intersection points. Active devices such as PIN diodes, varactor diodes, transistors, polarizers, amplifiers, transducers, and Faraday rotation devices have been used in active quasi-optical elements. Quasi-optical elements offer the potential of overcoming the power inadequacies of circuit based millimeter wave systems by providing an effective way to combine the outputs of multiple solid state devices to achieve high powers.

Interest in quasi-optical elements for millimeter wave systems has steadily increased over the past decade as methods for producing monolithic two-dimensional periodic arrays of active devices have improved and fundamental principles of operation have been elucidated. There remain, however, several limitations that require attention in order for quasi-optical elements to become mainstream. Outstanding limitations include active element insertion losses, scattering losses, active element power requirements, thermal effects due to power dissipation, and manufacturing challenges for large-scale grids such as precise substrate flatness requirements and precise dielectric thickness uniformity. Further performance improvements (e.g. greater variability of phase angle, wider reflection angles for stationary elements, tighter beam focusing, lower power requirements and/or heat dissipation in active grids) are also desired. A need exists for new quasi-optical materials and elements to further the potential of quasi-optical systems for use in controlling electromagnetic radiation, especially in the terahertz frequency portion of the electromagnetic spectrum.

SUMMARY OF THE INVENTION

The instant invention provides a stationary quasi-optical element for influencing electromagnetic radiation. In a pre ferred embodiment, terahertz frequency electromagnetic radiation (radiation in the millimeter and sub-millimeter wavelength portion of the electromagnetic spectrum) is controlled by the instant elements. The instant elements may be used to influence the reflection and/or transmission of electromagnetic radiation by influencing the optical phase angle characteristics of the radiation. The instant elements alter the optical phase of incident electromagnetic beams by providing inductive and/or capacitive phase shifts.

The instant elements are based on a conductive grid that includes active regions that include a volume of chalcogenide material. The spacing between adjacent active chalcogenide regions is less than or equal to the wavelength of the incident electromagnetic radiation that impinges the element. In a preferred embodiment, the active chalcogenide regions are periodically spaced in the grid. The chalcogenide material is a material that can be reversibly transformed from a crystalline state to one or more partially crystalline states to an amorphous state through the addition of energy. The electrical and optical properties of the chalcogenide material vary with its state of crystallinity. As a result, variations of the real and imaginary conductivities of the chalcogenide material affect the inductive or capacitive optical phase angle of the grid and accordingly affect the characteristics of reflected and/or transmitted electromagnetic radiation produced from an incident electromagnetic wavefront. More specifically, by spatially controlling the state of crystallinity of the chalcogenide material over the active regions, it is possible to influence the phase angle of reflected and/or transmitted electromagnetic radiation in the millimeter, sub-millimeter and other wavelength ranges. As a result of this spatial control, beam steering, beam shaping or wavefront correction of beams of terahertz and other frequencies of electromagnetic radiation is possible over a wide range of angles and spatial profiles in both reflection mode and transmission mode.

Spatial variation of the fractional crystallinity of the chalcogenide regions of the instant elements may be accomplished in binary mode or multilevel mode. In binary mode, each chalcogenide region is one of two structural states and a spatial variation in fractional crystallinity is achieved statistically through averaging over spatially distinct portions of the element, where each spatially distinct portion includes a plurality of chalcogenide regions. In a preferred binary embodiment, the two structural states are the amorphous and crystalline states of the chalcogenide material. In multilevel mode, the chalcogenide regions may include a chalcogenide material in three or more structural states. In this embodiment, each chalcogenide region may be in an amorphous state, a crystalline state or a state that, on a volume fraction basis within the region, is partially amorphous and partially crystalline. In this embodiment, spatial variation in fractional crystallinity may be accomplished through spatial averaging over many chalcogenide regions or through a variation in the fractional crystallinity of individual chalcogenide regions over a series of chalcogenide regions in one or more directions.

The regions of chalcogenide material in the grid render the instant elements active and provide for quasi-optical like elements that are reconfigurable since the structural state of the volume of chalcogenide included in the active regions of the instant elements can be reversibly transformed over two or more structural states having fractional crystallinities that range from an amorphous state to a crystalline state. In a preferred embodiment, the chalcogenide regions are spaced periodically in the grid of the instant elements.

In one embodiment, an element is provided that provides for the steering of incident beams of terahertz and other frequencies of radiation in reflection mode. In this embodiment, the reflection angle of an incident beam can be controlled by using the element to control the phase angle of the reflected beam. This embodiment provides for non-specular reflection of incident beams.

In another embodiment, an element is provided that provides for steering of incident beams of terahertz and other frequencies of electromagnetic radiation in transmission mode. In this embodiment, the transmission angle of an incident beam can be controlled by using the element to control the phase angle of the transmitted beam. This embodiment provides for transmission of an incident electromagnetic beam in a non-refractive direction.

In yet another embodiment, an element is provided that focuses or defocuses an incident beam of terahertz or other frequency radiation in reflection mode.

In still another embodiment, an element is provided that focuses or defocuses an incident beam of terahertz or other frequency radiation in transmission mode. Embodiments in which focusing or defocusing in combination with non-specular reflection or non-refractive transmission are also provided.

In a further embodiment, an element is provided for correcting or removing distortions in the wavefront of a beam of terahertz or other frequency of electromagnetic radiation.

DETAILED DESCRIPTION OF THE INVENTION

Figure 1A:
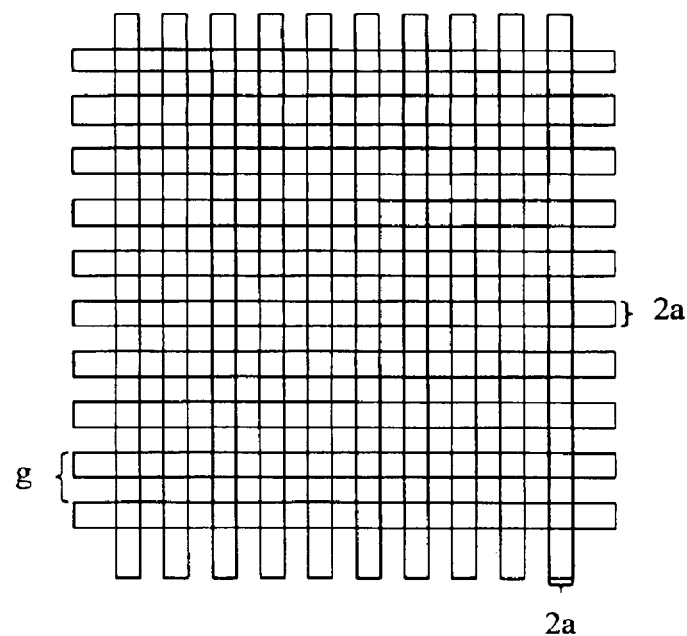
FIG. 1A. A periodic conducting grid.

The instant invention provides elements for controlling the reflection and transmission properties of electromagnetic radiation. The instant elements operate by controlling the phase angle of reflected or transmitted electromagnetic radiation produced from incident electromagnetic radiation and may operate in a stationary configuration. Consequently, the instant elements may be referred to as phase angle controlled stationary elements (PACSE). Since the instant elements may act on electromagnetic radiation traveling in free space, the instant elements may also be viewed as examples of quasi-optical elements. The instant elements include a chalcogenide material as an active component and achieve variability of influence over the reflection and transmission properties of electromagnetic radiation through spatial variations in the structural state of a chalcogenide material in one or more active regions of a grid.

The co-pending parent application, U.S. patent application Ser. No. 10/226,828 incorporated by reference above, provides a discussion of controlling the phase angle of electromagnetic radiation with a chalcogenide material and presents elements for wavefront engineering of electromagnetic radiation. The PACSE elements of the co-pending application include elements that comprise a plurality of regions of a chalcogenide material distributed in a pattern across one or more spatial dimensions where the fractional crystallinity of the chalcogenide material varies from region to region, thereby forming a crystallinity gradient. The fractional crystallinity of spatially distinct chalcogenide regions was controlled through the formation of amorphous marks within an otherwise crystalline chalcogenide region. The size and/or number of amorphous marks provide for tunable control of the volume fraction of crystallinity with variations therein across two or more chalcogenide regions providing for a crystallinity gradient. Since the influence of the chalcogenide material on the phase angle of incident electromagnetic radiation varies with fractional crystallinity, the crystallinity gradients of the elements of the co-pending application provide a phase taper that alters the phase angle characteristics of an incident electromagnetic beam to produce a reflected and/or transmitted electromagnetic beam having controlled phase angle characteristics. The steeper the crystallinity gradient, the greater the effect on the phase angle and the greater the deviation from specular reflection and/or refractive transmission. Several examples illustrating the ability of the elements of the co-pending application to control the angle of propagation, angle of reflection or degree of focusing of an electromagnetic beam are described in the co-pending application.

It is desirable to have PACSE elements that operate over a wide range of wavelengths of electromagnetic radiation and therefore to consider the suitability of the PACSE elements of the co-pending U.S. patent application Ser. No. 10/226,828 for operation at different wavelengths. Of particular interest is the suitability of the PACSE elements described in the co-pending application for electromagnetic radiation in the terahertz frequency regime, where the wavelength range is about two orders of magnitude longer than the optical wavelength range. The wavelength of operation of a PACSE device impacts the design requirements of a PACSE element. More specifically, the operating wavelength needs to be considered in the sizing of certain features of a PACSE. The overall device size, mark size and mark spacing are among the features having a range of permissible values that are influenced by the operating wavelength.

The overall size of a PACSE element must balance the desire for achieving a high degree of control over the phase of reflected or transmitted electromagnetic radiation and the desire to minimize diffraction effects. As described in the co-pending parent application, the greatest control over phase angle is achieved in a PACSE element that possesses a strong crystallinity gradient, where a strong crystallinity gradient is one in which the change in fractional crystallinity is greatest over the shortest possible distance. A strong crystallinity gradient provides the phase control necessary to permit greater deviations from specular reflection and/or greater deviations from refractive transmission.

Since the maximum variation in fractional crystallinity is fixed to a range extending from amorphous (0% crystallinity) to crystalline (100% crystallinity) and since the amorphous, crystalline and a continuous series of partially crystalline states are achievable in practical operation, the design goal of maximizing the crystallinity gradient amounts to a desire to minimize the size of the PACSE element. For a given range of fractional crystallinity, a smaller device leads to stronger crystallinity gradients and a commensurately greater range of control over the phase angle of reflected and/or transmitted radiation.

A reduction in the size of the PACSE element, however, intensifies diffraction effects and diminishes the efficiency of transmission or reflection of phase controlled electromagnetic radiation. As a PACSE element becomes smaller relative to the operating wavelength, aperture-like diffraction effects of the operating radiation from the PACSE element become increasingly important. As the diffraction efficiency increases, the efficiency of the transformation of incident electromagnetic radiation to phase controlled reflected and/or transmitted radiation decreases and the performance of the PACSE element accordingly is diminished. The increase in diffraction efficiency as a PACSE element becomes small is analogous to the increase in diffraction efficiency of incident electromagnetic radiation in the presence of an aperture as the size of the aperture decreases. Diffraction constitutes an undesired loss of a portion of the incident radiation and leads to a reduction in the efficiency of the conversion of incident radiation to phase controlled reflected and/or transmitted radiation.

Designing the size of a PACSE element thus represents a compromise between competing effects. Larger elements minimize undesired diffraction effects, but do so at the expense of the strength of the crystallinity gradient. Smaller elements increase the strength of the crystallinity gradient, but are accompanied by greater diffraction losses. The instant inventors believe that a PACSE size (e.g. the length of a square shaped PACSE element) less than about twice the operating wavelength would lead to unacceptably high diffraction effects and that PACSE sizes in the range of 2–5 times the operating wavelength represent an appropriate trade-off between diffraction losses and range of phase control for many applications. PACSE sizes outside this range are still expected to provide phase control according to the principles of the instant invention, but do so in a less than optimum fashion. PACSE devices having a size below twice the operating wavelength provide phase control over a wide range, but suffer from poor conversion efficiency due to high diffraction losses. PACSE devices having a size above about quintuple the operating wavelength also provide phase control with the benefit of low diffraction losses, but do so over a range of phase angles that may be too limited for some applications. The size of a PACSE element may be selected according to the needs of a particular application. If a high degree of phase control is desired and conversion efficiency can be sacrificed, smaller PACSE devices (e.g. elements having a size below about twice the operating wavelength) may be appropriate. If high conversion efficiency is desired and the range of phase control can be sacrificed, larger PACSE elements may be appropriate.

A consequence of the considerations related to the sizing of a PACSE element according to the co-pending application is that the application of the PACSE concept in the terahertz frequency range requires an increase in the size of the PACSE element relative to the size of PACSE elements suitable for operation at optical frequencies. At an operating wavelength of, for example, 1.5 $\mu$m (near-infrared), a PACSE element having an active area of e.g. 5 $\mu$m×5 $\mu$m would provide acceptable performance. At an operating wavelength of 0.15 mm (2 THz), in contrast, the corresponding PACSE element according to the co-pending application would have an active area of 500 $\mu$m×500 $\mu$m. While PACSE devices according to the co-pending application having such sizes are possible and operable, the instant inventors have recognized that they may be impractical due to the corresponding scaling requirements of the amorphous marks that need to be formed to provide crystallinity gradients that exploit the full range of crystallinity available from a chalcogenide material. The low end of the fractional crystallinity range requires a high amorphous phase volume fraction over a significant portion of the chalcogenide material. As the size of the PACSE element increases, it becomes necessary to be able to render larger and larger portions of the chalcogenide material amorphous in order to achieve structural states having the low fractional crystallinity needed to maximize crystallinity gradients and increase the degree of phase control available from chalcogenide materials.

In principle, the transformation of large area portions of a chalcogenide material from a crystalline state to an amorphous state may be accomplished through the formation of individual marks having a large size. In practice, however, it is difficult to form marks larger than about 1 $\mu$m in diameter. This limitation is a consequence of the high thermal energy requirements needed to form large marks. Amorphous mark formation occurs through a process in which energy is provided to a crystalline chalcogenide material in an amount sufficient to melt it followed by cooling at a rate sufficient to kinetically stabilize an amorphous phase while preventing recrystallization. Rapid cooling requires rapid dissipation of thermal energy from the area in which mark formation occurs. As the specified mark size increases, the total energy provided for melting increases and it becomes increasingly difficult to dissipate thermal energy at an adequate rate to prevent recrystallization in some portions of a large area. Other phenomena such as back crystallization also frustrate attempts to form large marks. As a result, attempts to form marks larger than about 1 $\mu$m in diameter face fundamental physical obstacles.

A practical mark size limitation of about 1 $\mu$m compromises the potential of using PACSE elements in accordance with the co-pending application in the terahertz frequency range. As indicated hereinabove, a typical PACSE device in the terahertz frequency range is expected to have dimensions on the order of 500 $\mu$m×500 $\mu$m. If it is desired, for example, to have a continuous linear crystallinity gradient ranging from 100% crystallinity to 0% crystallinity from left to right across a PACSE element, it would be necessary to have, on average, 50% of the area of the element in the amorphous state. 50% of a 500 $\mu$m×500 $\mu$m element amounts to an area of 125,000 $\mu$m$^2$. If we approximate the area of a 1 $\mu$m diameter mark and assume it to be 1 $\mu$m$^2$, we see that 125,000 marks would be required to achieve an average fractional crystallinity of 50% in the PACSE element. Since it takes about 0.1 $\mu$s to form a mark, the time required to form 125,000 marks would be 12.5 ms. Although possible, this amount of time is believed by the instant inventors to be impractically long, especially in applications in which reconfigurability is desired. In contrast, the corresponding mark writing or formation time for the 5 $\mu$m×5 $\mu$m PACSE element operating at a wavelength of 1.5 $\mu$m as described hereinabove, would be a much more acceptable 5 $\mu$s using 0.25 $\mu$m$^2$ marks formed at a rate of 0.1 $\mu$s (50% mark coverage of a 25 $\mu$m$^2$ area, where a smaller mark size is considered to insure that the mark dimensions are adequately smaller than the operating wavelength; further discussion on this point is provided hereinbelow and in the co-pending parent application). Practical limitations on mark size thus become more problematic as the operating wavelength increases and represent a potential drawback in the extension of the PACSE elements described in the co-pending parent application to long wavelengths.

The instant invention addresses this drawback by providing PACSE elements based on a reduction in the total volume of chalcogenide material over the total element area as compared to the elements described in the co-pending parent application. The instant PACSE elements obviate the need to form marks over large scale areas by providing a PACSE design that effectively leverages the ability of small area portions of chalcogenide material to provide practical operability in the terahertz frequency range. As described more fully hereinbelow, the instant elements include active regions of chalcogenide material in combination with a conductive grid. The chalcogenide active regions are included within the grid of the instant elements and the overall effect of the elements on incident electromagnetic radiation is determined by the conductive grid and the structural states of the active chalcogenide regions contained therein. Variations in the structural states of the chalcogenide regions provide tunability and reconfigurability of the response of the instant elements.

Incident electromagnetic radiation includes orthogonal electric and magnetic fields that oscillate at a frequency and wavelength that is characteristic of the radiation. Incident electromagnetic radiation interacts with the instant elements through ac coupling to induce internal electric fields that produce resonant current oscillations therein that produce reflected and/or transmitted output electromagnetic radiation. The instant elements influence, through inductive and capacitive effects, the phase angle characteristics of the induced current, thereby providing reflected and/or transmitted electromagnetic radiation having phase controlled propagation characteristics. The elements of the instant invention influence the direction of propagation in reflection and/or transmission as well as the degree of focusing of incident electromagnetic radiation. The design of the instant elements is particularly suited for incident electromagnetic radiation in the terahertz or other long wavelength frequency range.

An understanding of some of the principles underlying the influence of the instant elements on electromagnetic radiation is aided by consideration of the simple prior art grid shown in FIG. 1A, which shows a periodic planar conducting grid. In a typical application, the grid would be placed at the interface between two dielectrics having refractive indices $n_1$ and $n_2$ where the dielectrics may be a medium such as air or a solid material. The grid is a perforated conducting sheet with grid period g that includes conductive strips having a width 2a spaced apart by square perforations. The grid period g is no greater than the wavelength of the incident electromagnetic radiation that interacts with the grid so that the grid does not act as a diffraction grating. The wavelength of the incident electromagnetic radiation may be referred to herein as the operating wavelength of the grid. We consider by way of example the interaction of linearly polarized incident plane wave radiation with the grid of FIG. 1A.

Figure 1B:
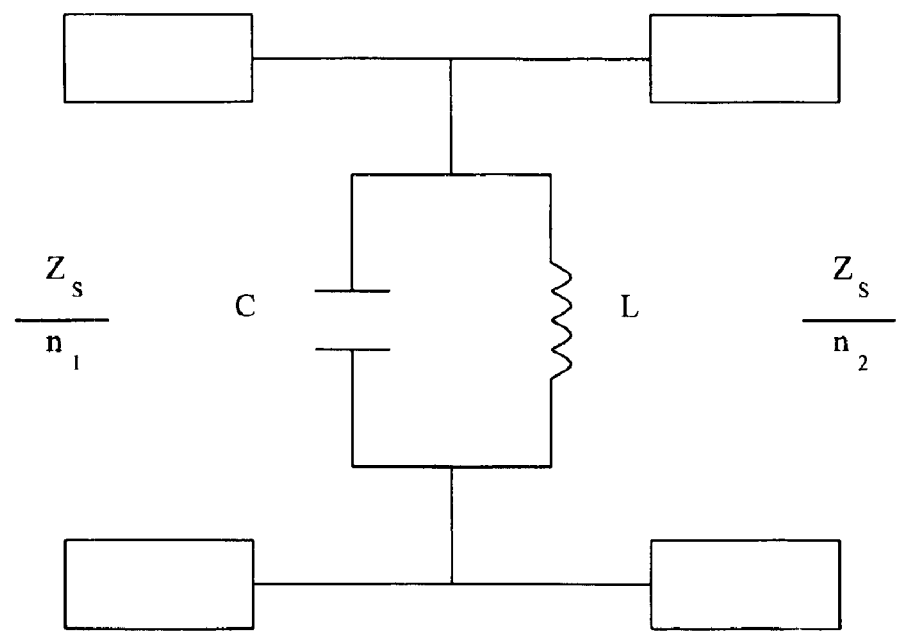
FIG. 1B. Equivalent circuit of the periodic conducting grid shown in FIG. 1.

The characteristics of the grid shown in FIG. 1A can be analyzed using a transmission line model. This model treats free space as a transmission line and diffracting objects as load impedances. Using a lumped element approximation, the equivalent circuit of the grid shown in FIG. 1A is shown in FIG. 1B. The equivalent circuit includes impedances $Z_s/n_1$ and $Z_s/n_2$ for the two dielectrics between which the grid is positioned along with a grid capacitance C and grid inductance L in parallel. The quantity $Z_s$ originates from the Maxwell wave equation for plane waves and is the intrinsic impedance of free space. In the transmission line model, the characteristic impedance of linearly polarized plane wave radiation in a vacuum is the intrinsic impedance of free space and is given by $$Z_S = \sqrt{\frac{\mu_0}{\epsilon_0}} = 377 \,\Omega,$$

where $\mu_0$ and $\epsilon_0$ are the permeability and permittivity of free space, respectively. In a dielectric medium, the impedance is scaled by the refractive index. The grid inductance L is due to the inductive effect of the conductive strips and is a monotonic function of the grid period. The grid capacitance C is due to the capacitance across the perforations of the grid.

The characteristic functionality of the grid shown in FIG. 1A is most easily demonstrated by considering impingement of normally incident, vertically polarized radiation on the grid. The electric field of vertically polarized incident radiation is parallel to the vertical strips of the grid. Under these conditions, the incident radiation induces a current in the vertical strips of the grid along with an associated inductance and a capacitance that develops in the vertical direction across the perforations separating the horizontal strips. This inductance and this capacitance correspond to the circuit elements depicted in the equivalent circuit of FIG. 1B. Since the inductance of the vertical strips and the parallel capacitance between horizontal strips have frequency dependent frequency dependent susceptances, the effect of the grid on the incident radiation depends on the frequency of the radiation.

In addition to an ability to interact with arbitrary frequencies, it is known from the art of LC circuits that LC circuits (such as the one shown in FIG. 1B) have characteristic resonance frequencies that depend on the inductance L and the capacitance C. In the circuit of FIG. 1B, the susceptance of the inductance of the vertical strips and the susceptance of the capacitance between horizontal strips are 180° out of phase. As a result, these susceptances may cancel at one or more frequencies to produce the condition known as resonance. More specifically in the current context, the equivalent circuit shown in FIG. 1B has a parallel resonance frequency at which the grid of FIG. 1A is perfectly transmissive. At the parallel resonance frequency, the inductive susceptance of the vertical strips is canceled out by the capacitive susceptance of the spaces that separate the horizontal strips. As a result, the parallel susceptance is zero and incident electromagnetic radiation at the parallel resonance frequency is transmitted with no reflection loss.

The parallel resonance frequency depends on the refractive indices $n_1$ and $n_2$ as well as the inductance and capacitance of the grid. In a free-standing grid (a grid surrounded by air, $n_1=n_2=1$), the wavelength of incident electromagnetic radiation having the parallel resonance frequency is between g (the grid period) and 2g, depending on the shape of the grid perforations. For square perforations, for example, the parallel resonance frequency is approximately equal to g. For rectangles, crosses and other perforation shapes having one dimension narrower than others, the parallel resonance frequency shifts to longer wavelength. Surrounding dielectrics with indices of refraction greater than one increase the capacitance of the grid and lead to a lowering of the parallel resonance frequency. As the frequency of incident electromagnetic radiation deviates from the parallel resonance frequency, the transmission of the grid gradually decreases and reflection losses increase. On balance, the grid provides a broad transmission bandpass centered at or near the resonant frequency.

The resonant frequency and bandpass characteristics of the grid can be engineered by controlling the grid spacing, strip width, cell motif (including perforation shape) and refractive indices of the surrounding dielectrics. This follows because these quantities influence the inductive and capacitive susceptances of the grid and therefore determine the frequency range over which the inductive and capacitive susceptances are equal or approximately equal.

The prior art grid shown in FIG. 1A is approximately representative of a passive quasi-optical element and finds practical use in transmission. Greater control over the transmission and reflection properties of electromagnetic radiation in passive grid designs can be achieved by combining two or more grids in free standing configurations or in combination with one or more dielectric substrates. The grid spacing, horizontal and vertical strip widths, and dielectric constants of each of a plurality of grids can be independently varied to control the inductive and capacitive reactances, susceptances, etc. of the grids, individually and in combination, to effect greater control over the bandpass characteristics, central bandpass frequency, reflection efficiency, transmission efficiency etc. The spacing between grids provides another degree of freedom as, for example, two parallel grids separated by a dielectric may function analogous to the Fabry-Perot oscillators commonly used in optical systems. Different combinations or characteristics of passive grids in essence represent ways of varying the inductive and capacitive effects of the grids. Different grid configurations have equivalent circuits that include different series and parallel combinations of inductors and capacitors and represent different ways of influencing incident electromagnetic radiation through inductive and capacitive effects. The grid pattern can be a square lattice, as in FIG. 1A, or another periodically repeating lattice shape such as rectangular, hexagonal, triangular, etc.

Further functionality enhancements may be obtained with active grid elements. In an active grid, an active electronic component is included in the grid and is typically inserted into one or more of the conductive strips of the grid. The active component provides inductive and/or capacitive reactances and/or susceptances to the element in addition to those provided by the conductive strips and any dielectrics that may be present. The active component typically can be transformed among two or more states, each of which has distinct inductive and/or capacitive effects. Accordingly, the overall functionality of the element depends on the state of the active component and variability of functionality (e.g. tunability) becomes available from active grids. In the context of influencing incident electromagnetic radiation, the variable functionality means that the reflection and/or transmission characteristics of incident electromagnetic radiation depend on the state of the active component and that different characteristics are provided by different states. The performance of an active grid can therefore be varied to meet the needs of different applications.

Figure 2A:
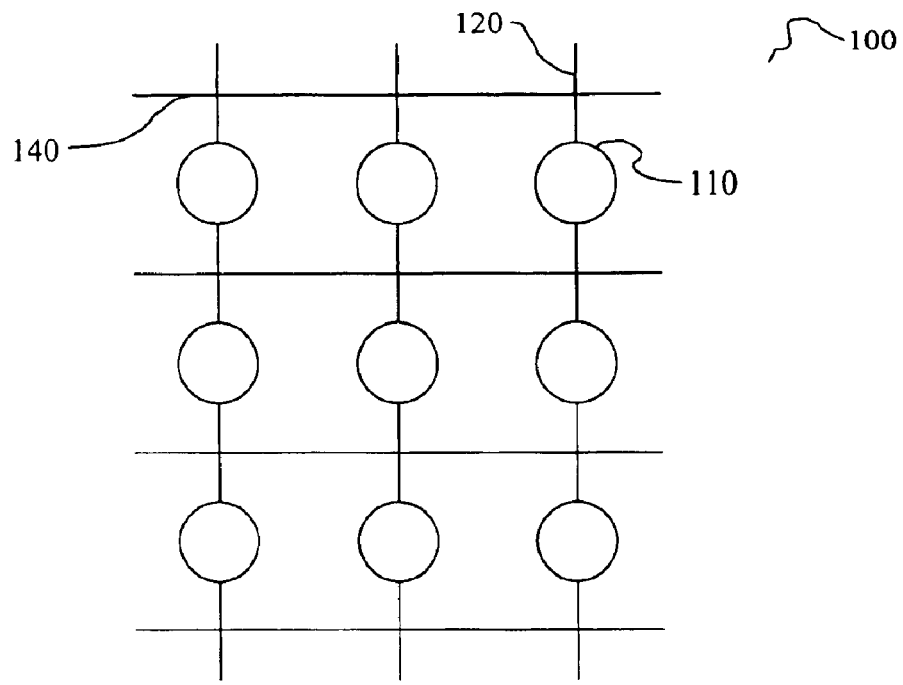
FIG. 2A. Schematic depiction of an embodiment of an element having an active grid.
Figure 2B:
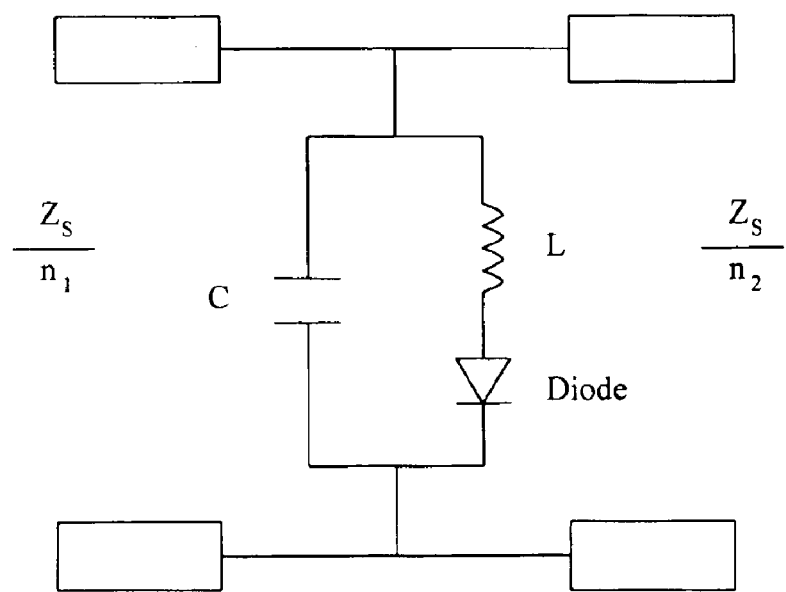
FIG. 2B. Equivalent circuit of the active grid element shown in FIG. 2A where the active component is a diode.

A schematic depiction of one embodiment of an active grid element is presented in FIG. 2A. The element 100 includes active components 110, vertical conductive strips 120 and horizontal conductive strips 140. Although the conductive strips shown in FIG. 2A are depicted as lines, it is to be understood that the conductive strips have a thickness, diameter, and/or shape, that the thickness, diameter and/or shape may be uniform or non-uniform in the length direction and that the thickness, diameter and/or shape may or may not be equal for the different conductive strips within a grid. The foregoing statement applies to all embodiments depicted or otherwise described herein. The active components of this embodiment are periodically positioned in the element and connected in series in the vertical strips. In active grids described in the prior art, the active component may be a diode. In one example from the prior art, a PIN diode is used as the active component 110 in the grid 100 shown in FIG. 2A. In this prior art, the PIN diode is in series with the inductance of the vertical strips and the equivalent circuit shown in FIG. 2B is obtained, where it is assumed that the grid is positioned between two dielectrics having refractive indices $n_1$ and $n_2$. A PIN diode has two states: a forward bias state and a reverse bias state. In the forward bias state, the impedance of the PIN diode is primarily resistive in the MHz–THz frequency range and the diode element in the equivalent circuit can be modeled as a simple resistor. In the reverse bias state, the impedance of the PIN diode is primarily capacitive and the diode element in the equivalent circuit can be modeled as a capacitor.

A transmission line analysis of the equivalent circuit when the diode is reverse biased indicates that the active grid exhibits a series resonance frequency at which the capacitive reactance of the diodes cancels the inductive reactance of the grid stripes. At the series resonance frequency, incident electromagnetic radiation with linear polarization parallel to the vertical strips is nearly perfectly reflected. The reverse bias state of the diode thus provides a highly reflective grid at and near the series resonance frequency. Since the series resonance frequency can be varied by controlling the inductance of the vertical strips and the capacitance of the diode in the reverse bias state, grid elements can be designed to optimally reflect incident electromagnetic beams over a wide range of frequencies. In the forward bias state, the diode becomes resistive and the grid becomes more transmissive. Further control over the reflection and transmission characteristics can be achieved by combining active grid elements or by combining active grid elements and passive grid elements. A nearly perfectly transmissive element can be obtained, for example, by combining the active grid shown in FIG. 2A in which the active components are forward biased diodes with the passive grid element shown in FIG. 1A and an intervening dielectric material to form a Fabry-Perot cavity. The cavity has a resonance frequency at which perfect transmission (in the absence of losses) occurs, where the resonance frequency depends on the thickness and refractive index of the dielectric as well as the impedances of the grids.

In the instant elements, a volume of chalcogenide material is included as the active component of a grid. The instant elements include active regions that include a volume of chalcogenide material. The active regions may also be referred to herein as regions of chalcogenide materials, chalcogenide regions, active chalcogenide regions or the like. In a preferred embodiment, the instant grids are periodic and have a period or characteristic repeat distance smaller than the wavelength of the incident electromagnetic radiation acted on by the grid (the operating wavelength). This requirement insures that the instant elements do not act as diffraction gratings. The chalcogenide material is a phase change material that has a crystalline state and an amorphous state. By providing energy to the chalcogenide material, it is possible to reversibly transform the chalcogenide material between its crystalline and amorphous states. As described more fully hereinbelow, the complex permittivity of a chalcogenide material is different in the amorphous and crystalline states. This difference then governs a corresponding effect on the conductivity, inductance, capacitance and phase shift characteristics of the instant elements to provide phase angle control of transmitted and/or reflected electromagnetic radiation. Active functionality is achieved in the instant grids through control of the structural states of the chalcogenide material in one or more active regions. Structural states having a volume fraction of crystallinity that ranges continuously from crystalline (fractional crystallinity of 100%) to amorphous (fractional crystallinity of 0%) are available for the active chalcogenide regions of the instant elements.

In a preferred embodiment, the active regions of chalcogenide material are distributed periodically in periodic grids. The active regions are discrete, being separated by conductive strips or portions thereof, and have sizes that do not exceed the size of the unit cell of the grid and are preferably much smaller than unit cell size. As used herein, the unit cell of a grid is the basic repeat unit of a grid. A periodic grid may be viewed as the replication of the unit cell in one or more directions. The unit cell corresponds to a repeating unit bounded by two or more conductive strips of the grid. In a square grid, the unit cell is a square and the regions of chalcogenide material are no larger than the size of the repeating square. In a rectangular grid, the unit cell is a rectangle and the regions of chalcogenide material are no larger than the size of the repeating rectangle. In a triangular grid, the unit cell is a triangle and the regions of chalcogenide material are no larger than the size of the repeating triangle. In a hexagonal grid, the unit cell is a hexagon and the regions of chalcogenide material are no larger than the size of the repeating hexagon. The maximum size of the chalcogenide regions in other grid geometries may be analogously determined. In many embodiments, the size of the chalcogenide regions may be significantly smaller than the grid or unit cell dimensions.

Figure 2C:
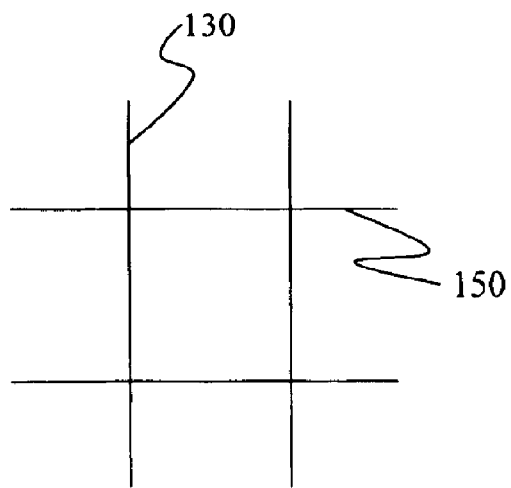
FIG. 2C. Portion of a square grid having intersecting conductive strips.
Figure 2D:
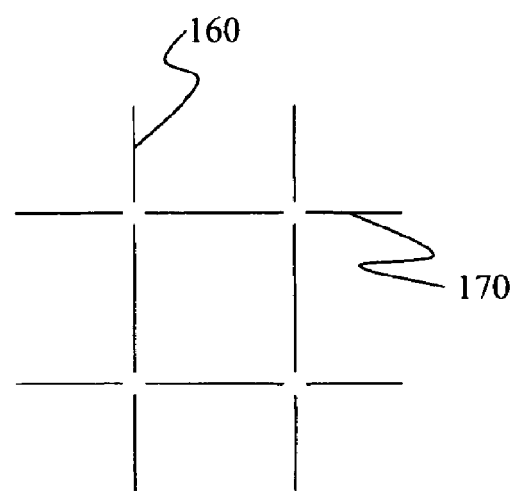
FIG. 2D. Portion of a square grid having non-intersecting conductive strips.

The conductive strips of the grids of the instant elements may be intersecting or non-intersecting. Grids with a square unit cell, for example, include horizontal and vertical conductive strips that intersect to define a square perforation. A square grid may also include non-intersecting horizontal and vertical strips whose spacing suggests a square perforation. Examples of square grids with intersecting and non-intersecting conductive strips are depicted in FIGS. 2C and 2D, respectively. The grid depicted in FIG. 2C includes vertical conductive strips 130 that intersect with horizontal conductive strips 150. The grid in FIG. 2D shows vertical conductive strips 160 that do not intersect horizontal conductive strips 170. The strips depicted in FIG. 2D may be referred to herein as conductive segments or segmented conductive strips. In grids with non-intersecting strips, a capacitance develops in the gaps between strips and this capacitance further contributes to the overall effect of the grid on the phase characteristics of reflected and/or transmitted electromagnetic radiation. Grids with non-square unit cells may analogously include intersecting or non-intersecting conductive strips, or a combination thereof.

The preferred periodic grids of the instant invention have a periodic spacing in one or more directions. A periodic spacing is a repeat distance characteristic of the unit cell of a periodic grid. A periodic spacing of a square grid, for example, corresponds to the length of the side of the square. A rectangular grid has periodic spacings corresponding to the length and width of the rectangular unit cell where the length and width represent periodic spacings in two different directions and correspond to the distance between a pair of parallel sides. A periodic spacing of a triangular grid may be a side length or height of the triangular unit cell. Since a triangular unit cell may be equilateral or non-equilateral, a triangular grid may have periodic spacings in one or more directions. A periodic spacing of a hexagonal grid may be the distance between a pair of parallel sides of the hexagonal unit cell. Periodic spacings for grids based on other unit cell shapes may be analogously defined. Unit cells within the scope of the instant invention may include no periodic spacings, one periodic spacing or two periodic spacings.

In the volume of chalcogenide material in an active region of the instant grids, the chalcogenide material can be in a crystalline state, an amorphous state, or partly in a crystalline state and partly in an amorphous state. The relative proportions of the crystalline and amorphous states in a volume of chalcogenide material can be expressed in terms of a percent or fractional crystallinity of the region. The fractional crystallinity of a region can range continuously from 0% (fully amorphous) to 100% (fully crystalline). A region of chalcogenide material having a fractional crystallinity of 50%, for example, is half amorphous and half crystalline on a volume basis. Since the wavelength of incident electromagnetic radiation is larger than the size of a chalcogenide region, the incident electromagnetic radiation interacts with the full volume of chalcogenide material in an active region of the instant elements. As a result, the specific influence, contribution, or modification of the chalcogenide on the overall effect of the grid on incident electromagnetic radiation is determined by a weighted average of the dispersive properties (e.g. inductive, capacitive, and phase shift properties) of the amorphous and crystalline states of the chalcogenide in the region.

Since the fractional crystallinity of chalcogenide material in an active region of a grid is continuously variable, the active chalcogenide regions possess a continuum of structural states, each of which imparts distinct dispersive properties (e.g. inductive, capacitive and phase shift properties) to the grid and each of which, therefore, contributes or leads to a grid having a distinct influence on the reflection, transmission and propagation characteristics of incident electromagnetic radiation.

In many embodiments, the size of individual chalcogenide regions and the size of the unit cells of the grid are much smaller than the operating wavelength of the grid. In these embodiments, the spacing between chalcogenide regions is much smaller than the operating wavelength. As a result, the phase characteristics of reflected and/or transmitted radiation produced from incident electromagnetic radiation at the operating wavelength are a manifestation of an average over multiple chalcogenide regions, each of which may have a different fractional crystallinity. In these embodiments, averaging of fractional crystallinity occurs not only within a particular chalcogenide region, but also across several distinct, spatially separated chalcogenide regions.

While not wishing to be bound by theory, the instant inventors believe that the averaging may be viewed more generally in the context of an effective medium approximation description of the interaction of light at a particular wavelength with non-homogeneous objects having features at sub-wavelength length scales. According to the effective medium approximation, the ability of electromagnetic radiation to resolve, sense, be influenced by or "see" features is limited approximately to features having a size at or greater than its wavelength. Features smaller than the wavelength (sub-wavelength features) are not separately resolved or sensed by the radiation and do not separately influence the radiation. Instead, the incident radiation resolves or senses an average of sub-wavelength features where the average is over a length scale corresponding approximately to the wavelength. The basic result of the effective medium approximation is that a non-homogeneous material having features at sub-wavelength length scales can be viewed approximately on the wavelength or longer length scales as a homogeneous material having uniform properties corresponding to an average over the properties of the sub-wavelength features. The effective medium approximation becomes an increasingly better approximation as the feature size of sub-wavelength objects decreases.

In the instant elements, the effective medium approximation applies to the interaction of electromagnetic radiation at the operating wavelength with chalcogenide regions, domains or unit cells having a dimension that is smaller than the operating wavelength (a sub-wavelength dimension) and is especially relevant where one or more properties of the chalcogenide regions or unit cells vary over sub-wavelength distances. Of greatest interest in the context of the instant invention are variations in the fractional crystallinity over several sub-wavelength sized chalcogenide regions. As indicated hereinabove, spatial variations in the fractional crystallinity of the active chalcogenide regions of the instant elements underlie the phase control provided by the instant element. When incident electromagnetic radiation impinges a set of sub-wavelength chalcogenide regions having a collective dimension below the operating wavelength, the fractional crystallinity of that set of regions as perceived by the incident radiation is an average over the individual sub-wavelength regions. The effective fractional crystallinity over a wavelength scale portion of the element may accordingly be viewed as an average over the sub-wavelength chalcogenide regions contained within that portion of the element. The averaging occurs within each sub-wavelength element and among the different chalcogenide regions within the wavelength scale portion.

As a result of the considerations from the effective medium approximation, a particular fractional crystallinity of a wavelength scale portion of many embodiments of the instant elements may be achieved in many ways. Consider, for example, a wavelength scale portion that has a fractional crystallinity of 50% and assume that 4 sub-wavelength chalcogenide regions having equal volumes of chalcogenide material are included within that portion. The 50% fractional crystallinity may be achieved, for example, with the individual sub-wavelength regions having fractional crystallinities of 20%, 40%, 60%, and 80%. Since multiple fractional crystallinities are used in this example, this mode of obtaining wavelength scale average of 50% may be referred to as a multistate mode. Alternatively, the 50% fractional crystallinity may be achieved by letting two of the four sub-wavelength chalcogenide regions be in the amorphous state (0% fractional crystallinity) and letting the other two regions be in the crystalline state (100% fractional crystallinity). This mode of averaging may be referred to as a binary mode since only two structural states of the chalcogenide material are present in the set of chalcogenide regions. Many ways of achieving 50% or any other average fractional crystallinity over a wavelength scale portion of the instant elements are possible and within the scope of the instant invention. Since the size of the chalcogenide regions of the instant elements may be significantly smaller than the operating wavelength, averaging in the context of the effective medium approximation may occur over tens, hundreds, or even more chalcogenide regions.

In addition to sub-wavelength variations in the fractional crystallinities of the chalcogenide regions of the instant elements, sub-wavelength variations in the conductance and/or inductance of the conductive strips may also be present. Such variations may arise, for example, through sub-wavelength variations in the width, length, spacing, shape or connectivity of conductive strips in one or more directions within an element. Grids including, for example, a combination of intersecting and non-intersecting grid lines may show sub-wavelength variations in conductance and/or inductance where the separation between the intersecting and non-intersecting portions of the grid is less than the operating wavelength. Similarly, a non-uniform spacing of conductive strips in one or more directions may similarly provide a sub-wavelength variation in conductance and/or inductance due to the grid lines where the spacing between non-uniformly spaced strips is less than the operating wavelength. In the presence of sub-wavelength variations in the conductance or inductance of the conductive strips, the effective medium approximation indicates that the conductance or inductance of a wavelength scale region corresponds to an average over the sub-wavelength portions. In embodiments having sub-wavelength variations in the properties of conductive strips and chalcogenide regions, the average over a wavelength scale portion corresponds to an overall average of effects contributed by the conductive strips and chalcogenide regions.

The instant grids include active chalcogenide regions and provide active control over incident electromagnetic beams through the influence of the chalcogenide material on the conductivity, induction, capacitance, and phase shift characteristics of the grid. Many properties and compositions of phase change chalcogenide materials are known in the art and have been discussed previously, for example, in U.S. Pat. Nos. 3,271,591; 3,530,441; 4,653,024; 4,710,899; 4,737,934; 4,820,394; 5,128,099; 5,166,758; 5,296,716; 5,534,711; 5,536,947; 5,596,522; 5,825,046; 5,687,112; 5,912,104; 5,912,839; 5,935,672; 6,011,757; and 6,141,241 to the instant assignee, the disclosures of which are hereby incorporated by reference, as well as in co-pending U.S. patent application Ser. No. 10/226,828. A brief review of some of the properties and compositions of phase change chalcogenide materials as they pertain to the instant elements is presented in the following several paragraphs.

The application of energy to a volume of phase change chalcogenide material induces transformations among its structural states. Phase change materials have characteristic melting and crystallization temperatures and the structural state may be influenced through the controlled application of energy vis-à-vis these temperatures. Application of energy sufficient to heat a phase change material above its melting temperature followed by rapid quenching promotes the formation of an amorphous phase. Slow cooling, on the other hand, may permit crystallization and the formation of crystalline regions within a volume of phase change material to provide partially crystalline or crystalline materials. Application of energy in an amount sufficient to heat a phase change material to between its crystallization and melting temperatures may induce a partial or complete transformation of amorphous regions to a crystalline phase.

Energy may be applied to selected portions of a volume or region of phase change material to induce localized structural transformations without disturbing surrounding portions of the phase change material in the region. Such localized structural transformations may be used to alter the fraction crystallinity of the volume of chalcogenide material in the active regions of the instant grids. Localized structural transformations may also be used to control the size, shape or volume of one phase within a surrounding matrix of another phase. The shaping of amorphous phase regions (e.g. marks) within a crystalline matrix using a low thermal budget strategy, for example, has been previously described in U.S. patent application Ser. No. 10/026,395, the disclosure of which is hereby incorporated by reference.

Transformations among structural states of a volume of chalcogenide material are effected by the application of energy to a phase change material, or portions thereof, in appropriate amounts at appropriate rates. Energy in various forms may be used to effect transformations among structural states. The energy may be in the form of electromagnetic radiation (including energy from optical, ultraviolet, visible, infrared, laser and radio wavelength sources), electrical energy, thermal energy, chemical energy, magnetic energy, mechanical energy, particle beam energy, acoustic energy or combinations thereof using a single energy source or a plurality of energy sources. Delivery of electrical energy, for example, may be in the form of electrical current or voltage and may be continuous or in the form of a pulse whose height and width can be controlled. In some embodiments of the instant invention, active regions are connected in series within one or more conductive strips. In these embodiments, the conductive strips may be used as leads for delivering electrical energy to the volume of chalcogenide material within one or more active regions, thereby inducing a change in the structural state of the one or more active regions. Optical energy may be in the form of a pulsed or continuous laser beam having a controlled beam profile, wavelength, energy and/or power. By controlling the intensity, duration, pulse profile etc. of applied energy, it is possible to precisely control the structural state or fractional crystallinity of a region of chalcogenide material in the instant grids. Active regions can be addressed with energy individually or in combinations to provide any desired distribution of chalcogenide fractional crystallinity across the active regions of the instant elements.

Illustrative phase change materials suitable for use in accordance with the instant invention are those that include one or more of the elements In, Ag, Te, Se, Ge, Sb, Bi, Pb, Sn, As, S, Si, P, O and mixtures or alloys thereof, including eutectic and non-eutectic compositions. In a preferred embodiment, the phase change material includes a chalcogen element. In a most preferred embodiment, the phase change material includes Te as the chalcogen element. Also preferred are phase change materials that include a chalcogen in combination with Ge and/or Sb such as $Ge_2Sb_2Te_5$, $Ge_4SbTe_5$, $Sb_2Te_3$, $Ge_{22}Sb_{22}Te_{56}$ and related materials (Ge—Sb—Te ternaries, In—Sb—Te ternaries, In—Sb—Ge ternaries, Te—Ge—Sb—S quaternaries etc.). GeTe alone or in solid solution with CdTe constitutes another preferred embodiment. In another preferred embodiment, the phase change material includes Ag and/or In; especially in combination with Sb and/or Te. Compositions within the AgInSbTe family (AIST) and GeInSbTe family (GIST) are another preferred embodiment. In another preferred embodiment, the phase change material includes a chalcogen and a transition metal such as Cr, Fe, Ni, Nb, Pd, Pt or mixtures and alloys thereof. Some examples of phase change materials suitable for use in accordance with the instant invention are provided in the U.S. patents incorporated by reference hereinabove. Materials suitable in the context of the instant invention may also include a mixture of a dielectric material and a phase change material. Examples of such mixtures are described in commonly assigned U.S. Pat. No. 6,087,674, the disclosure of which is hereby incorporated by reference.

Active functionality is achieved in the instant grids through variations in the properties of the active regions that occur with variations in the fractional crystallinity of the volumes of chalcogenide materials included therein. The optical and electrical properties of phase change chalcogenide materials differ in the crystalline and amorphous states. Representative properties that differ in the crystalline and amorphous states include refractive index, absorption coefficient, dielectric constant, dielectric permittivity, conductivity, impedance, capacitance, capacitive reactance, inductance, and inductive reactance. Chalcogenide regions in structural states that are partly amorphous and partly crystalline typically have properties intermediate in value between those of the purely crystalline and purely amorphous states. The co-pending U.S. patent application Ser. No. 10/226,828 incorporated by reference hereinabove discusses variations in the reflectance, transmission and absorption properties of chalcogenide materials with crystalline volume fraction.

Of particular relevance to the instant grids are variations in impedance or complex conductivity of the different structural states of the chalcogenide material included in the active regions of the grids. The impedance of a material is a complex quantity that provides a measure of the opposition that a circuit element presents to the flow of alternating current. The impedance includes a resistance (the real part of impedance) and reactance (the imaginary part of impedance). The reactance in turn includes a capacitive contribution (capacitive reactance) and an inductive contribution (inductive reactance), where the capacitive and inductive reactances combine with opposite signs to provide the reactance. Depending on the sign of reactance, it may be either capacitive or inductive relative to the phase angle of the alternating current. The reciprocal of the impedance is the admittance or complex conductivity of a material. The admittance includes a real part (the conductance) and an imaginary part (the susceptance). The susceptance further includes a capacitive contribution (capacitive susceptance) and an inductive contribution (inductive susceptance), where the capacitive and inductive susceptances combine with opposite signs to provide the susceptance.

The impedance and admittance have phase angles associated therewith, where the tangent of the phase angle is given by the ratio of the imaginary part to the real part of the impedance and complex conductivity, respectively. The phase angle of a complex number may be positive or negative depending on the signs of the real and imaginary parts. The real parts of the impedance and complex conductivity are positive, so the signs of the phase angles of the impedance and complex conductivity are determined by the signs of their imaginary parts. Since the capacitive and inductive contributions to the imaginary parts of the impedance and complex conductivity have opposite signs, the sign of the phase angles of the impedance and complex conductivity are determined by the relative balance of the capacitive and inductive contributions.

Figure 3:
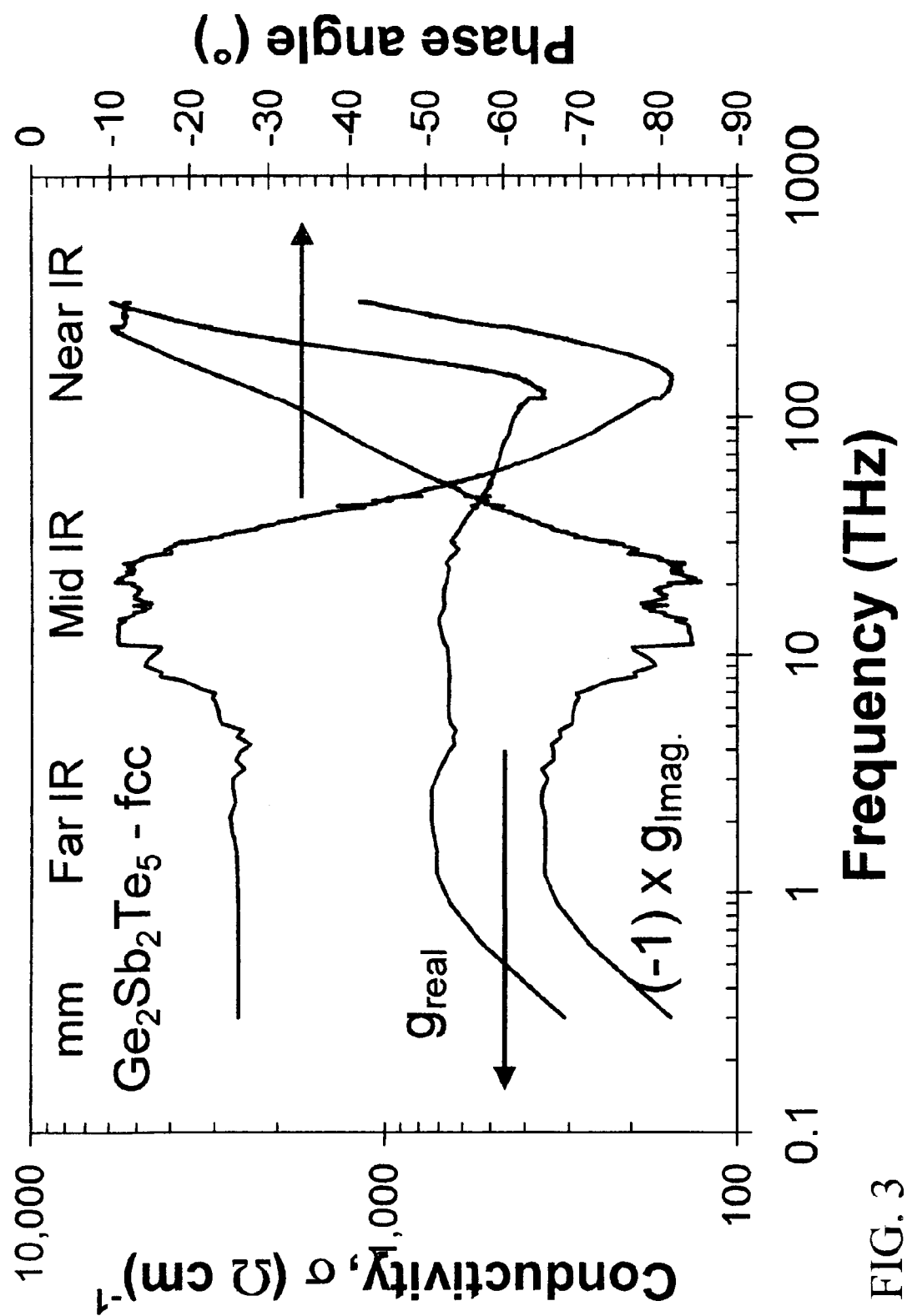
FIG. 3. Plot showing the real and imaginary conductivities and phase angle of a chalcogenide material ($Ge_2Sb_2Te_5$) as a function of frequency.

FIG. 3 shows the variation of the real part, the imaginary part and the phase angle of the complex conductivity of a representative chalcogenide material ($Ge_2Sb_2Te_5$) as a function of the frequency of electromagnetic radiation. The curves shown in FIG. 3 correspond to the crystalline phase of $Ge_2Sb_2Te_5$. The real part of the complex conductivity ($g_{real}$) and the imaginary part of the complex conductivity ($g_{imag}$, presented as $-g_{imag}$) are referred to the ordinate axis on the left side of FIG. 3 and the phase angle is referred to the ordinate axis on the right side of FIG. 3. FIG. 3 shows that the conductance, susceptance and phase angle of crystalline $Ge_2Sb_2Te_5$ are frequency dependent and indicates that the effect of crystalline $Ge_2Sb_2Te_5$ on the reflection, transmission and phase angle of incident electromagnetic radiation is also frequency dependent. The resistance and reactance of crystalline $Ge_2Sb_2Te_5$ are also frequency dependent.

The amorphous phase of $Ge_2Sb_2Te_5$ is much less conductive than the crystalline phase and has much smaller values for the real and imaginary parts of the complex conductivity and impedance. As a result, the crystalline and amorphous phases of $Ge_2Sb_2Te_5$ influence incident electromagnetic radiation in different ways. Regions of $Ge_2Sb_2Te_5$ that are partly crystalline and partly amorphous have resistances, reactances, conductances and susceptances that reflect a combination of the values of the pure crystalline and pure amorphous phases. Partially crystalline regions typically have values for properties that are intermediate between those of the crystalline and amorphous phases.

The general principles illustrated in FIG. 3 are operable in phase change chalcogenide materials in general. By varying the fractional crystallinity of a volume of chalcogenide material, it is possible to vary the effect of a chalcogenide material on incident electromagnetic radiation. The overall effect of the instant grid elements on the reflection, transmission and/or phase of incident electromagnetic radiation can be described in terms of the impedance or admittance of the grid element as a whole, including all constituent units such as the metal strips, any dielectric materials, and any active components or materials. Active functionality is obtained from the instant elements through variations in the fractional crystallinity of chalcogenide volumes included as active components. The different structural states of the active chalcogenide regions of the instant grids contribute differently to the overall impedance or complex conductivity of the instant elements, thereby providing for tunable performance of the instant elements with respect to the reflection, transmission or phase angle characteristics of incident electromagnetic radiation.

The instant elements include elements that can be used as reflection or transmission elements with or without beam steering capability. A reflection element without beam steering is an element that reflects an incident beam of electromagnetic radiation in a specular direction where the reflected beam may have a different phase angle or different degree of focusing than the incident beam. A reflection element with beam steering is an element that reflects an incident beam of electromagnetic radiation in a non-specular direction where the reflected beam may have a different phase angle or different degree of focusing than the incident beam. A transmission element without beam steering is an element that transmits an incident beam of electromagnetic radiation in a direction corresponding to the incident direction modified by refractive effects associated with any dielectrics that may be present in the element where the transmitted beam may have a different phase or different degree of focusing than the incident beam. In a free-standing grid, for example, the grid is not supported by a dielectric and is surrounded by air. Since air has a refractive index very close to one, a transmissive free-standing grid without beam steering according to the instant invention transmits an electromagnetic beam in essentially the incident direction where the transmitted beam may have a different phase or degree of focusing than the incident beam. In an element in which a grid is supported by a dielectric, a transmissive element without beam steering according to the instant invention transmits and refracts an electromagnetic beam to provide a transmitted beam in a direction corresponding to the incident direction as modified by the refractive index of the dielectric. The effect of the refractive index of a dielectric material on the transmission of electromagnetic radiation is frequently described in terms of Snell's Law. The direction of transmission of an incident beam by a transmissive element without beam steering according to the instant invention may be referred to as the direction of refraction or refractive direction. A transmission element with beam steering according to the instant invention is an element that transmits an electromagnetic beam in a direction other than the refractive direction, where the transmitted beam may have a different phase or degree of focusing than the incident beam. In a transmission element with beam steering, beam steering corresponds to a redirection of an electromagnetic beam beyond any redirection relative to the incident direction due to refraction.

The phase angle characteristics of the active chalcogenide regions of the instant elements determine whether beam steering is achieved. As described in the co-pending U.S. patent application Ser. No. 10/226,828, beam steering effects (e.g. non-specular reflection) may be accomplished by controlling the dispersive characteristics of a pattern of discrete chalcogenide regions distributed on a surface or substrate. More specifically, beam steering may be achieved through the presence of a phase taper in one or more directions in an array of chalcogenide regions, where a phase taper corresponds to a variation of the phase angle of the chalcogenide material from one chalcogenide region to another in the pattern. The presence of a phase taper implies a non-zero differential in phase angle from one region to another in the pattern as well as a non-uniform distribution of phase angles across the chalcogenide regions of the pattern.

In embodiments of the instant elements in which the active chalcogenide regions are smaller than the operating wavelength the constituency of a phase taper may be considered in light of the effective medium approximation described hereinabove. According to the effective medium approximation, incident electromagnetic radiation is influenced by portions of the instant elements having a size on the order of the operating wavelength. Features having a sub-wavelength size influence electromagnetic radiation collectively, rather than separately, and present effective properties or influences that correspond to an average over multiple sub-wavelength features. In the instant elements, the effective medium approximation is applicable to the fractional crystallinity and properties dependent thereon (e.g. impedance, admittance, dispersive characteristics) of active chalcogenide regions having a sub-wavelength dimension in one or more directions. In the context of the effective medium approximation, a phase taper is not limited to a requirement that the fractional crystallinity of each of a series of adjacent active chalcogenide regions in a particular direction within a grid be different. Instead, a phase taper may also be present where a variation in fractional crystallinity is present between adjacent non-overlapping or partially overlapping wavelength scale or smaller portions of an element where each wavelength scale or smaller portion comprises a plurality of sub-wavelength active chalcogenide regions and where a variation or difference in fractional crystallinity between adjacent sub-wavelength active chalcogenide regions within a particular wavelength scale or smaller portion is not necessarily present. In other words, a phase taper in accordance with the instant invention is also present where the average fractional crystallinity varies for different wavelength scale or smaller portions aligned in one or more directions within a grid where each wavelength scale or smaller portion comprises a plurality of sub-wavelength active chalcogenide regions.

Wavelength scale or smaller portions of an element may be referred to herein as domains. A domain is a portion of an element having at least one cross-sectional dimension that is no larger than the operating wavelength (the wavelength of electromagnetic radiation incident to the element) of the element. Preferably, domains include two cross sectional dimensions that are no larger than the operating wavelength and most preferably these two cross sectional dimensions are smaller than the operating wavelength. A dimension that is smaller than the operating wavelength may be referred to herein as a sub-wavelength dimension. A domain having at least one sub-wavelength cross sectional dimension may be referred to herein as a sub-wavelength domain. Domains having no sub-wavelength cross sectional dimension may be referred to herein as wavelength scale domains. In a preferred embodiment, the wavelength scale or sub-wavelength dimensions of a domain correspond to cross sectional dimensions in the plane of the instant elements. Domains according to the instant invention are wavelength scale or sub-wavelength portions of an element that include a plurality of sub-wavelength active chalcogenide regions. Within a domain, no specific requirement is imposed on the positioning of the sub-wavelength chalcogenide regions. The active chalcogenide regions may be distributed or positioned randomly, periodically or otherwise within a domain. No correlation between the arrangement of active chalcogenide regions within a domain and the arrangement of domains within an element is required. Periodically arranged domains, for example, may include active sub-wavelength chalcogenide regions that are periodically, non-periodically or otherwise arranged. No relationship, correspondence or correlation of the arrangements of sub-wavelength chalcogenide regions within different domains is imposed.

In another preferred embodiment, the domains of an element are periodic. In this embodiment, the element is comprised of a plurality of periodically arranged domains where the domains are substantially identical in size and shape and where the domains may be wavelength scale or sub-wavelength. In a periodic array of domains, individual domains may act as diffraction sites and it is desired to minimize diffraction by appropriately sizing the domains. Diffraction from individual domains is more severe for wavelength scale domains than for sub-wavelength domains. Hence sub-wavelength domains are a preferred embodiment and particularly preferred embodiment is one in which the domains are sufficiently smaller than wavelength scale to avoid or minimize diffraction effects. Operating conditions such as the angle of incidence of the incident electromagnetic radiation influence the extent to which domains need be sub-wavelength to avoid or minimize diffraction effects. Avoidance or minimization of domain diffraction effects can be achieved with larger sub-wavelength domains in the case of normally incident radiation as compared to non-normally incident radiation. As the direction of incidence increasingly deviates from the direction normal to the element, sub-wavelength domains of increasingly smaller size are needed to avoid or minimize diffraction effects.

Figure 4A:
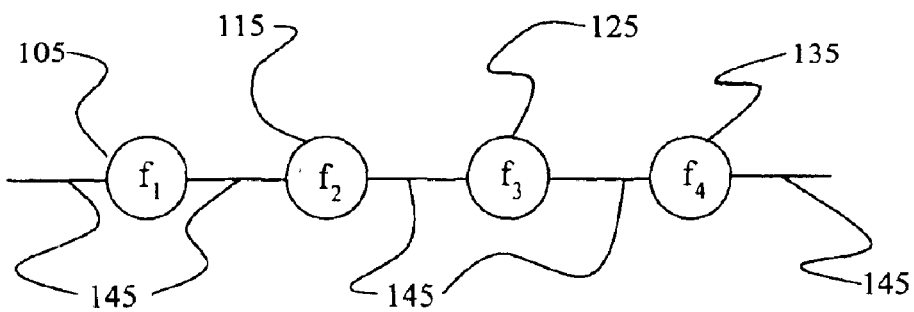
FIG. 4A. Portion of a grid having a continuous phase taper.

A phase taper may be referred to herein as a continuous phase taper where the fractional crystallinity increases or decreases monotonically for each of a series of consecutive chalcogenide regions along a particular direction of an element. An example of a portion of a grid according to the instant invention having a continuous phase taper is depicted in FIG. 4A which shows a continuous phase taper oriented in a horizontal direction that includes active chalcogenide regions 105, 115, 125 and 135 having fractional crystallinities $f_1$, $f_2$, $f_3$, and $f_4$, respectively; and conductive segments 145 where $f_1 < f_2 < f_3 < f_4$. In this example, the fractional crystallinity is a monotonically increasing function over a consecutive series of active chalcogenide regions aligned in a rightward horizontal direction. Alternatively, the fractional crystallinity may be viewed as a monotonically decreasing function in a leftward horizontal direction.

Figure 4B:
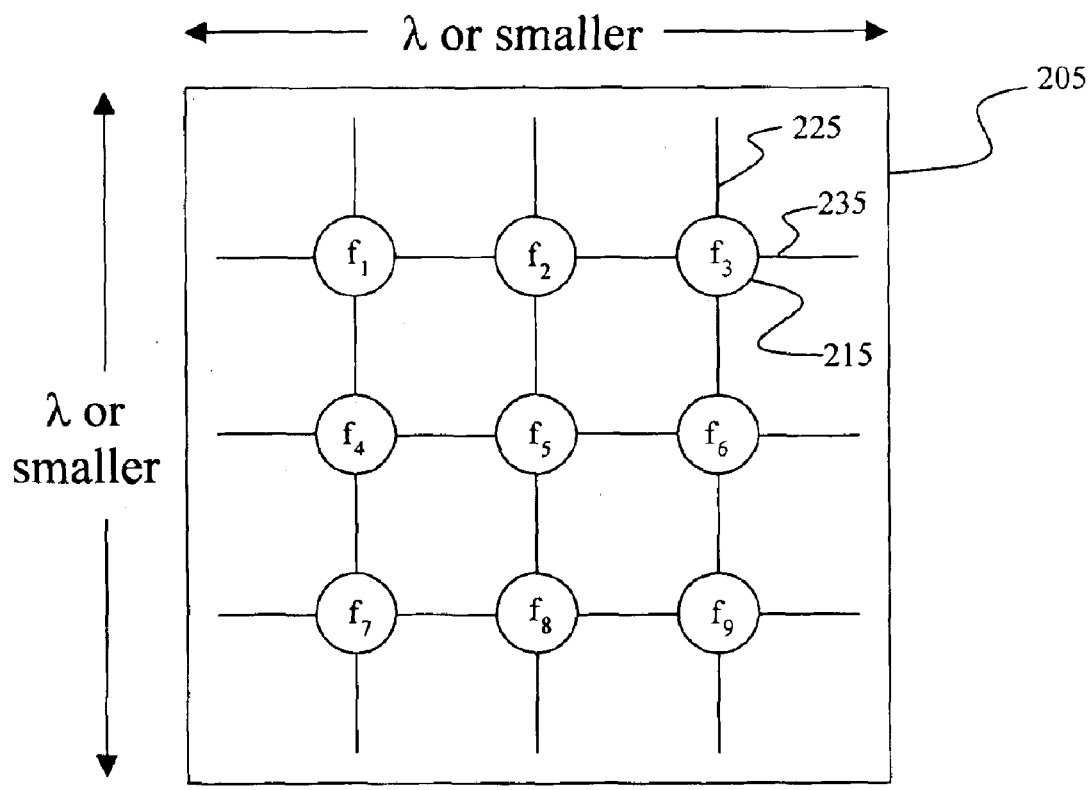
FIG. 4B. A domain comprising a plurality of active chalcogenide regions.

A phase taper may be referred to herein as a discrete phase taper where the average fractional crystallinity increases or decreases monotonically for each of a series of consecutive non-overlapping or partially overlapping domains along a particular direction of an element, where each domain includes a plurality of sub-wavelength active chalcogenide regions and where the fractional crystallinity of each of a series of consecutive active chalcogenide regions in a particular direction within a domain may or may not increase or decrease consecutively in a monotonic fashion. An example of a square shaped domain is depicted in FIG. 4B. The domain 205 has a characteristic domain dimension on the scale of the operating wavelength $\lambda$ of the grid or smaller. Since the domain 205 of the embodiment of FIG. 4B is square shaped, the domain includes two characteristic dimensions of wavelength scale or smaller. These dimensions are indicated with "$\lambda$ or smaller" in FIG. 4. The domain 205 includes sub-wavelength active chalcogenide regions 215 having fractional crystallinities $f_1$–$f_9$ (which may be referred to collectively as $f_i$), vertical conductive strips 225, and horizontal conductive strips 235. In the embodiment of FIG. 4B, the domain includes nine active chalcogenide regions. The fractional crystallinity of the domain 205 may be obtained by averaging over the individual chalcogenide regions. Since the fractional crystallinities of the individual active chalcogenide regions are independently controllable and since the domain fractional crystallinity is obtained as an average over several individual chalcogenide regions, it is evident that a particular value of the domain fractional crystallinity may be achieved in multiple ways.

Figure 4C:
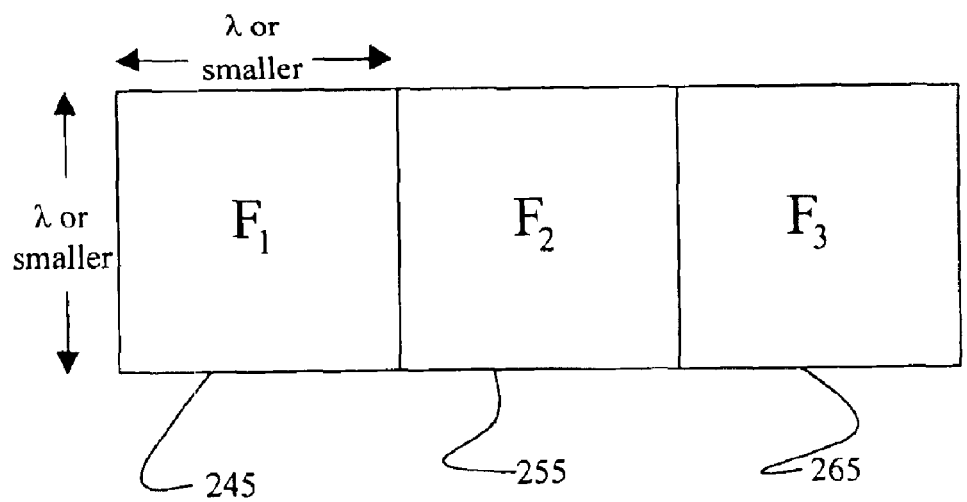
FIG. 4C. Portion of an element that includes a series of three non-overlapping domains.
Figure 4D:
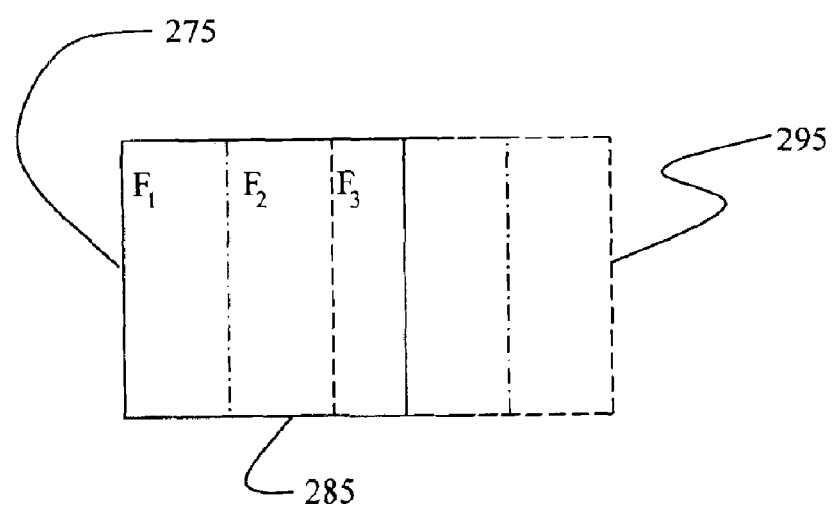
FIG. 4D. Portion of an element that includes a series of three overlapping domains.

Examples of discrete phase tapers formed from square shaped wavelength scale or smaller domains are depicted in FIGS. 4C and 4D. The embodiment of FIG. 4C is a portion of an element that includes non-overlapping square shaped domains 245, 255, and 265 aligned in a horizontal direction. Each of the domains includes a conductive grid (not shown) that includes a plurality of active chalcogenide regions (not shown). As an example, each of the domains 245, 255, and 265 may include the conductive grid having 9 active chalcogenide regions shown in FIG. 4B. The domains 245, 255, and 265 may include the same or different number of individual active chalcogenide regions and the same or different grid geometry or configuration. The grid in one domain may or may not be physically connected to grids in other domains. The domains 245, 255, and 265 have domain fractional crystallinities $F_1$, $F_2$, and $F_3$, respectively; where each fractional crystallinity $F_i$ is obtained as an average over the fractional crystallinities $f_i$ of the individual active chalcogenide regions contained within the domain. In the context of the instant invention, the domains 245, 255, and 265 represent a consecutive series of domains and a discrete phase taper in a horizontal direction is present where, for example, $F_1 > F_2 > F_3$ or $F_3 > F_2 > F_1$; regardless of the specific values or trends of the fractional crystallinities of the individual active chalcogenide regions within each domain. As indicated hereinabove, a particular domain fractional crystallinity $F_i$ may be achieved in many ways when obtained as an average over a plurality of individual sub-wavelength active chalcogenide regions having fractional crystallinities $f_i$. In the context of the instant invention, therefore, a phase taper may be present even where the fractional crystallinities over a consecutive series of individual chalcogenide regions within a domain do not increase or decrease monotonically.

In the context of the instant invention, non-overlapping domains may be contiguous or non-contiguous. Contiguous domains are domains that do not overlap, but that border one another as in the embodiment of FIG. 4C. Non-contiguous domains are non-overlapping domains that are spatially separated without sharing a border so that a gap is present between adjacent domains in a non-contiguous series. As this example shows, a phase taper is present, and beam steering is enabled, when the average fractional crystallinity over a series of contiguous or non-contiguous domains is monotonically increasing or decreasing, where each domain includes a plurality of sub-wavelength active chalcogenide regions.

FIG. 4D depicts an embodiment of a portion of a grid having a discrete phase taper formed from overlapping square shaped domains 275 (solid), 285 (dash-dot) and 295 (dashed) oriented in a horizontal direction and having domain average fractional crystallinities $F_1$, $F_2$ and $F_3$; respectively, obtained by averaging the fractional crystallinities $f_i$ of the individual active chalcogenide regions included within each domain. A discrete phase taper according to the instant invention is present in this embodiment where the domain fractional crystallinities $F_1$, $F_2$ and $F_3$ are monotonically increasing or decreasing.

As indicated hereinabove, the arrangement or positioning of active chalcogenide regions within domains that form a discrete phase taper is unconstrained and may be periodic, aperiodic or otherwise. The number, size or shape of active chalcogenide regions within a domain or domains are further unconstrained and may be similar, dissimilar, correlated, uncorrelated etc. Fractional crystallinity as averaged over a domain is a relevant consideration in the establishment of a discrete phase taper.

Embodiments that include a discrete phase taper provide a crystallinity gradient with respect to fractional crystallinity averaged over domains comprising a plurality of sub-wavelength chalcogenide regions. The fractional crystallinities of specific sub-wavelength regions or across specific series of chalcogenide regions are not constrained in the context of a discrete phase taper. The fractional crystallinity requirements needed to produce a crystallinity gradient and to establish a phase taper apply on the domain size scale and a variety of different combinations of fractional crystallinities for the individual active chalcogenide regions within the domains are possible. Other than a need to collectively provide on average for a crystallinity gradient in the domain fractional crystallinity, no specific requirement need be satisfied by individual active chalcogenide regions within the domains. The absence of such a requirement provides for flexibility in the establishment of a discrete phase taper and leads to different modes for accomplishing the phase angle control necessary to achieve beam steering, focusing and/or wavefront correction in the context of the instant invention.

The formation of a domain having a particular fractional crystallinity may be accomplished in multistate mode or binary mode. In multistate mode, three or more structural states are utilized in controlling the fractional crystallinity of individual active chalcogenide regions in a domain. Each individual chalcogenide region exists in one of a pre-selected set of three or more structural states and some or all of the pre-selected set of states are represented in the sub-wavelength chalcogenide regions within a domain. The three or more structural states may be selected from among the amorphous, crystalline or partially crystalline states and the distribution of structural states across a plurality of sub-wavelength chalcogenide regions is limited only by the need to obtain a desired domain fractional crystallinity. The fractional crystallinity of a particular active chalcogenide region need not be related to or otherwise depend on the fractional crystallinity of other active chalcogenide regions.

Reconfiguration of a multistate element involves the inducement of a structural transformation of one or more individual elements from one structural state to another structural state within the set of pre-selected structural states associated with the element. The fractional crystallinity of a domain may be varied by varying all chalcogenide regions contained therein or a subset thereof.

In binary mode, the individual sub-wavelength active chalcogenide regions within a domain are limited to being in one of two structural states. Since a plurality of sub-wavelength chalcogenide regions are present within a domain, a statistical average over two structural states provides for a domain fractional crystallinity that may be intermediate between the fractional crystallinities of the two selected binary states. In a preferred binary mode embodiment, the two binary structural states are selected to be the crystalline and amorphous states. By distributing a pattern of crystalline and/or amorphous states across a plurality of sub-wavelength chalcogenide regions, a wide range of domain fractional crystallinities extending from 0% to 100%, including intermediate values, is possible. A discrete phase taper over a series of domains may be formed in either multistate mode, binary mode or a combination thereof (e.g. some domains programmed in binary mode, some domains programmed in multistate mode.)

Embodiments of the instant invention without beam steering capability include elements whose active regions contain chalcogenide volumes having fractional crystallinities that are substantially uniform across the element. That is, in these elements without beam steering capability, a plurality of active chalcogenide regions or domains is present where the fractional crystallinity of the chalcogenide volume in each active region or domain is substantially the same. As a result, the phase angle characteristics of the chalcogenide regions are substantially the same and essentially no differential in phase angle occurs from one chalcogenide region or domain to another in the element. Viewed alternatively, uniformity of fractional crystallinity across the active chalcogenide regions or domains implies an equivalence, or a close approximation thereof, in the local impedance, conductivity, reactance, susceptance etc. of the different active regions or domains. As a result, no phase taper is present and no beam steering effects are obtained.

These embodiments of elements without beam steering provide specular reflection or transmission in a refractive direction and may also alter the phase of an incident electromagnetic beam. In these embodiments, the active chalcogenide regions have a uniform fractional crystallinity across the element. This uniform fractional crystallinity is, however, variable and can be configured and reconfigured to provide any structural state of an active region between the purely amorphous and purely crystalline limits. Each structural state has a distinct phase angle and influences the phase angle of incident electromagnetic radiation in a distinct way. Hence, the phase angle of a reflected or transmitted beam provided by these embodiments of the instant elements without beam steering capability may differ from the phase angle of the incident beam. Elements without beam steering thus provide control over the phase angle of incident electromagnetic radiation. As described more fully in EXAMPLE 3 hereinbelow, the instant invention also includes elements without beam steering that modify the degree of focusing of an incident electromagnetic beam.

Elements of the instant invention with beam steering capability include active chalcogenide regions or domains that store a phase taper. A phase taper corresponds to a non-uniform distribution of phase angle characteristics distributed across the active chalcogenide regions or domains of the instant elements as described hereinabove. In the instant invention, variations in the fractional crystallinity of the chalcogenide volumes across two or more active regions or domains of a grid provide a phase taper. As discussed hereinabove, the impedance, complex conductivity, susceptance, reactance, etc. of a chalcogenide phase change material vary with the structural state and fractional crystallinity of a chalcogenide region or domain comprising a plurality of sub-wavelength chalcogenide regions. Through controlled variation of the fractional crystallinity across a series of chalcogenide regions or domains in the instant elements, it is possible to establish a non-zero differential in phase angle between chalcogenide regions or domains and to achieve beam steering capability in reflection and/or transmission. A gradient in fractional crystallinity in one or more directions across the active chalcogenide regions or domains of the instant elements provides a phase taper that may be used to provide a beam steering, focusing, wavefront correction etc. capability. A gradient in fractional crystallinity includes two or more active regions or domains across which at least two different structural states or two different domain average fractional crystallinities are present.

Beam steering as used herein refers to non-specular reflection or non-refractive transmission. Beam steering may also be referred to as reflection in a non-specular direction or transmission in a non-refractive direction. The degree of beam steering (e.g. deviation from specular reflection or refractive transmission) is determined by the phase angle differential between the active chalcogenide regions or domains of the instant elements. The phase angle differential, in turn, is a consequence of local variations in impedance, complex conductivity, reactance, susceptance etc. of the chalcogenide material due to a spatially varying fractional crystallinity in one or more directions across the active regions or domains of the instant elements. The degree of beam steering (as well as focusing and/or wavefront correction) thus depends on the separation between the active chalcogenide regions of the instant elements and the variation in fractional crystallinity across the active chalcogenide regions where a continuous phase taper is present and on the size of domains and the variation in fractional crystallinity across a series of domains where a discrete phase taper is present. A strong crystallinity gradient provides a greater degree of beam steering and may be achieved, for example, by closely positioning adjacent chalcogenide regions or domains in one or more directions and/or providing a significant increase in fractional crystallinity between adjacent regions or domains. Close spacing of chalcogenide regions or small domains and/or a large change in fractional crystallinity from region to region or domain to domain lead to formation of a strong crystallinity gradient, a large phase taper across the element and a greater degree of beam steering. In contrast, widely spaced chalcogenide regions or domains exhibiting a weak variation in fractional crystallinity lead to a smaller phase taper across the element and to a lesser degree of beam steering.

The total phase angle difference provided by a phase taper is determined by the crystallinity gradient associated with the phase taper. More specifically, the range of volume fraction of crystallinity present across a series of chalcogenide regions or domains in the instant elements influences the total phase angle difference and degree of beam steering provided by the instant elements. The phase of a chalcogenide material (or effect of a chalcogenide region or domain on beam steering, focusing, wavefront correction etc.) is dictated by its structural state (or states where a plurality of regions are concerned) where the most and least pronounced effects occur for a chalcogenide material in the crystalline and amorphous states (or vice versa) with states of intermediate fractional crystallinity providing intermediate effects. A phase taper (continuous or discrete) having a crystallinity gradient that extends from a purely crystalline state to a purely amorphous state over a given series of active chalcogenide regions or series of domains is generally expected to provide the maximum phase angle difference across the series and therefore provides the greatest degree of beam steering, focusing, wavefront correction etc. Phase tapers extending over structural states spanning a smaller variation in volume fraction of crystallinity over the same series of chalcogenide regions or domains provide a lesser degree of beam steering, focusing, wavefront correction etc.

In the instant invention, a crystallinity gradient may be provided by controlling the fractional crystallinity across a series of active chalcogenide regions or domains, thereby controlling the structural states of different active regions or within different domains. As indicated hereinabove and in several of the references incorporated herein, the volume fraction of crystallinity of a phase change material may be readily controlled with a high degree of precision through the judicious application of energy in appropriate amounts at appropriate rates at appropriate positions within a region of chalcogenide phase change material. The whole continuum of volume fraction of crystallinity extending from 0% to 100% is achievable, thereby enabling the formation of crystallinity gradients spanning virtually any range of fractional crystallinity across a series of chalcogenide regions or domains. As a result, precise control of the degree of beam steering, focusing, wavefront corrrection etc. is achievable with the instant elements.

The instant elements further provide a dynamic capability that permits a dynamic tuning of the beam steering, focusing and wavefront correction etc. capabilities. The dynamic adjustment capability stems from the ability to reversibly alter the fractional crystallinity of a volume of chalcogenide material. Interconversion between the crystalline, amorphous and partly crystalline, partly amorphous structural states of a volume of chalcogenide material is readily accomplished and as a result, reconfiguration of a crystallinity gradient or phase taper to modify the beam steering, focusing, wavefront correction etc. capabilities is possible with the instant elements. The degree of deviation from specular reflection or refractive transmission, for example, may be varied by varying the volume fraction of crystallinity over which the crystallinity gradient extends. A crystallinity gradient extending over a narrow range of fractional crystallinity generally provides a smaller deviation than a crystallinity gradient extending over a wide range of crystallinity over a particular series of active chalcogenide regions or domains of the instant elements. By varying the volume fraction of crystallinity in different active regions or average fractional crystallinity of domains in the instant elements, various degrees of beam steering, focusing, wavefront correction etc. may be achieved. A particular crystallinity gradient (whether manifested as a continuous or discrete phase taper) is readily reconfigured to form a new gradient having a different beam steering, focusing, or wavefront correction etc. capability. The speed of reconfiguration of the fractional crystallinity of a chalcogenide region is also fast. The instant inventors estimate that the quenching of an amorphous phase occurs on a sub-nanosecond timescale and that crystallization occurs on timescales of 10–60 ns. These speeds are many orders of magnitude faster than the speeds associated with the physical motion of mechanically reconfigurable systems such as MEMS devices. The instant phase change materials are also stable over many reconfigurations. The instant inventors estimate, for example, that the reversibility of interconversion between the amorphous and crystalline states of a phase change material is maintained over at least $3 \times 10^8$ cycles.

In addition to reconfigurability, use of a chalcogenide material as an active component is advantageous because each of its plurality of states can be maintained permanently without the need for persistently applying energy such as the bias energy required to maintain the forward and/or reverse bias states of a device such as a PIN diode. The different states of the chalcogenide material are non-volatile and persist when power is removed. In contrast, the different states of diodes, transistors and other electronic devices are volatile and are erased upon removal of power. As a result, the energy requirements of active grids that include electronic devices are far higher than the power requirements of the instant elements. In the instant elements, energy is only required to change the state of the chalcogenide material. Energy is not required to maintain grid functionality once an element has been converted to a particular state.

The instant grids modify the propagation characteristics of incident electromagnetic radiation. The instant grids receive incident electromagnetic radiation and alter its phase to produce reflected and/or transmitted electromagnetic radiation. The reflected or transmitted electromagnetic radiation may be directed in a non-specular direction or a non-refractive direction and/or may be focused or defocused. Wavefront correction is also possible. Representative influences of different embodiments of the instant elements on incident electromagnetic radiation are described in the examples presented hereinbelow. The instant elements act on incident electromagnetic radiation throughout the electromagnetic spectrum. By sizing the periodic spacing of a grid of conductive strips or segments appropriately relative to the wavelength of incident electromagnetic radiation, elements according to the instant invention can be constructed to influence incident electromagnetic radiation having a wavelength essentially any portion of the electromagnetic spectrum. The phase effects provided by the instant elements are operable on incident electromagnetic radiation whose wavelength is greater than or equal to a periodic spacing of the instant grids. In a preferred embodiment, incident electromagnetic radiation having a wavelength in the terahertz frequency range is acted on by the instant elements. This embodiment is preferred because of the lack of technologies available in the prior art that is applicable to the beam steering or beam shaping in the reflection and/or transmission of microwave and/or radiofrequency electromagnetic radiation. The elements of the instant invention provide for reconfigurable beam steering, focusing and/or wavefront correction capabilities and do so while avoiding the practical barriers associated with forming amorphous marks over extended areas of the grids. The instant elements, by combining a conductive grid with active regions of chalcogenide material effectively leverage the use of manageably sized active regions for terahertz frequencies.

Representative embodiments of the instant invention are presented in the following examples. These examples are intended to be illustrative of and not limiting of the full scope of the instant invention.

EXAMPLE 1

Figure 5A:
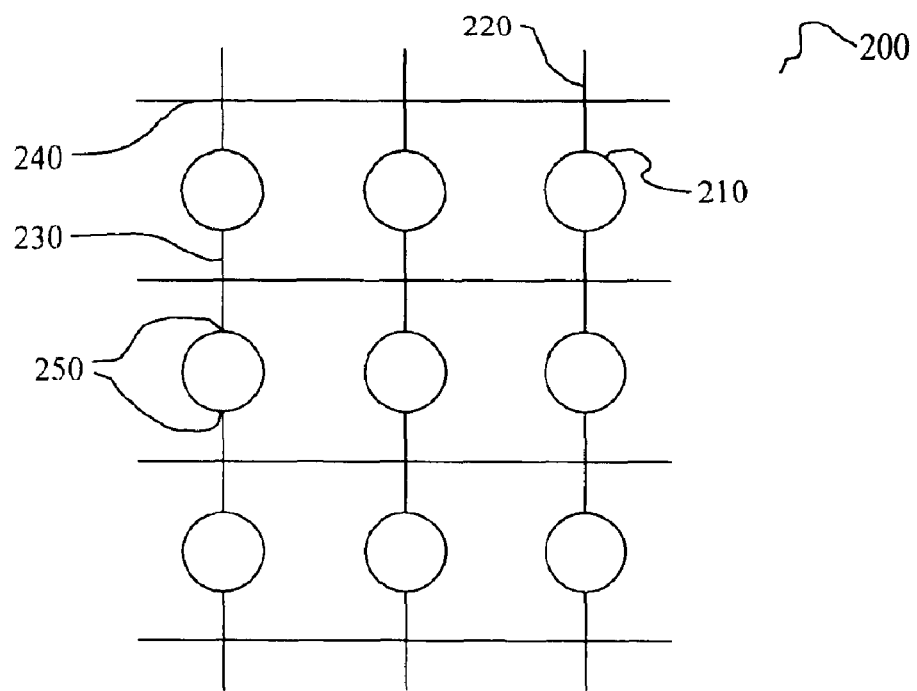
FIG. 5A. An element for reflecting or transmitting electromagnetic radiation that includes active regions that contain a volume of chalcogenide material.
Figure 5B:
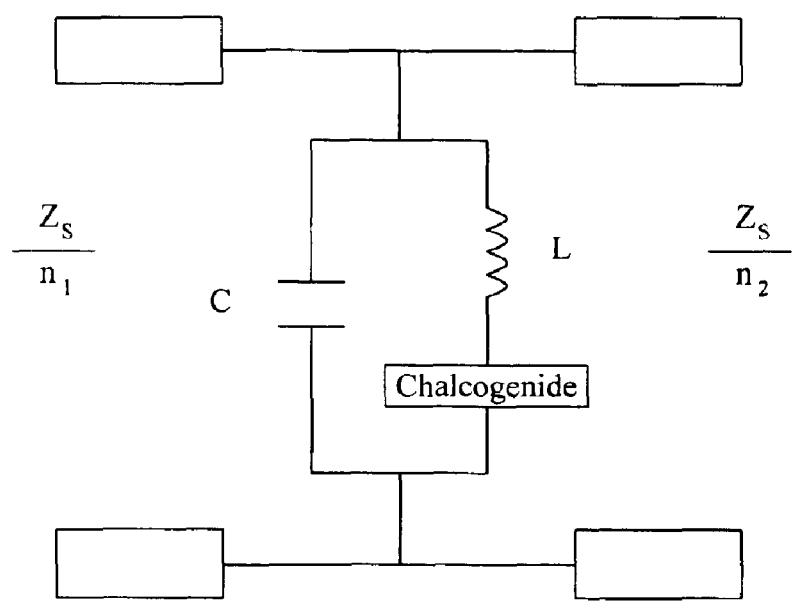
FIG. 5B. An equivalent circuit of the element shown in FIG. 5A.

In this example, a stationary element without beam steering is described. The element is schematically depicted in FIG. 5A. The element includes a square grid 200 with grid period g that includes horizontal conductive strips 240 and vertical conductive strips 220 that include conductive segments 230, active regions 210 that include a volume of chalcogenide material, and junctions 250 between chalcogenide regions 210 and conductive segments 230. The active chalcogenide regions 210 are connected in series with the conductive segments 230 to form vertical strips 220. The active chalcogenide regions 210 may also be said to interconnect conductive segments 230. In this embodiment, each active region 210 interconnects two conductive segments 230. Although the active regions 210 are schematically depicted as circles, the shape of the active regions, or volume of chalcogenide material therein, is not limited to a circular shape. Chalcogenide regions having any shape are within the scope of the instant invention, including in this example and the examples described hereinbelow. The element of this example includes the grid 200 as a free standing grid, a grid supported by a substrate or dielectric, or a grid interposed between two or more dielectrics. An equivalent circuit for the element is given in FIG. 5B, where C is the grid capacitance, L is the grid inductance, and $Z_s/n_1$ and $Z_s/n_2$ are the impedances of the two dielectrics surrounding the grid as described in connection with FIG. 1B hereinabove. The chalcogenide regions are shown in a series relationship with the grid inductance L.

In this embodiment, the fractional crystallinity of the chalcogenide regions 210 is uniform across the grid. That is, the fractional crystallinity of the volume of chalcogenide material included in the different active regions of the grid is substantially the same. The influence of the element on incident electromagnetic radiation depends on the structural state of the active chalcogenide regions. The amorphous phase of the chalcogenide material is a low conductivity phase that inhibits the flow of current in the vertical conductive strips 220. When the chalcogenide regions 210 are amorphous, the junctions 250 between the chalcogenide regions 210 and vertical segments 230 are primarily capacitive and the primary effect of the chalcogenide regions on the grid impedance is capacitive. More specifically, amorphous chalcogenide regions enhance the capacitive reactance of the grid and the chalcogenide regions may be modeled as a capacitor in series with the grid inductance in the equivalent circuit shown in FIG. 5B.

When the chalcogenide regions of this embodiment are in an amorphous state, the element may be used as a reflective element with little transmission loss over a range of frequencies at or near the series resonance frequency of the equivalent circuit. At the series resonance frequency, the capacitive reactance of the amorphous chalcogenide regions cancels or nearly cancels the inductive reactance of the grid strips. At or near this resonance frequency, the grid will present an essentially short circuit condition to an incident electromagnetic wave having a linear polarization parallel to the vertical strips. High reflectivity is a consequence of this condition. In principle, reflection without transmission or other losses occurs at or near the series resonance frequency. In practice, losses may occur in the grid, through the chalcogenide regions or through any surrounding dielectrics to lower the reflection efficiency to below 100%. Reflection efficiency is highest at an optimum frequency near or equal to the series resonance frequency and decreases as the frequency of incident radiation becomes higher or lower than this optimum frequency. As the frequency of incident radiation deviates from the optimum frequency, the element becomes more transmissive.

The series resonance frequency (or frequency of optimum reflection) may be a design parameter of the element. Using an idealized model of the equivalent circuit where the amorphous chalcogenide regions are ideal in the sense that they suffer no leakage, it is predicted that the series resonance frequency varies inversely with the square root of the product of the grid inductance and chalcogenide region capacitance. The grid inductance can be controlled through the width, shape and/or composition of the conductive strips and segments. The chalcogenide region capacitance can be controlled through the size, shape, number, separation and/or composition of the chalcogenide regions. Through judicious selection of grid and chalcogenide parameters, resonance frequencies and high reflection efficiencies over a wide range of incident frequencies is achievable with the element of this example.

As the chalcogenide regions of the embodiment of this example become more crystalline, they become more conductive. As the conductivity of the chalcogenide increases, the junction between the chalcogenide regions and the conductive segments becomes less capacitive and the impedance of the chalcogenide regions is no longer necessarily primarily due to capacitive reactance, but may also include significant contributions from the resistance or inductive reactance. Crystalline or partly crystalline chalcogenide regions may thus impart inductive or resistive effects, as well as capacitive effects, to the element and its equivalent circuit.

As the capacitive reactance of the chalcogenide regions becomes less important than the inductive reactance or resistance, the element becomes more transmissive. Optimal transmission is expected to occur when the capacitive reactance becomes negligible. Transmission is frequency dependent and becomes more efficient relative to reflection when the frequency of incident electromagnetic radiation is at or near the parallel resonance frequency of the equivalent circuit. In the limit of a negligible capacitive contribution from the chalcogenide regions, the parallel resonance frequency is a frequency at which the inductive reactance of the conductive strips of the grid (and any non-negligible inductive reactance associated with the chalcogenide regions) cancels the capacitive reactance of the conductive strips.

The parallel resonance frequency may also be a design parameter of the element and can be controlled by controlling the grid capacitance, chalcogenide conductivity, grid inductance, choice of dielectric materials, width, shape and separation of conductive strips or segments, size of the chalcogenide regions etc. Through judicious selection of grid and chalcogenide parameters, parallel resonance frequencies and/or high reflection efficiencies over a wide range of incident frequencies is achievable with the element of this example.

Additional embodiments of grids in accordance with this example may also include domains comprising a plurality of sub-wavelength chalcogenide regions in combination with conductive strips where the domain average fractional crystallinity is constant or essentially constant over a series of domains within an element. The portion of the grid depicted in FIG. 5A, for example, may be such that the active chalcogenide regions 210 are sufficiently small in size that the collective dimensions spanned by the regions 210 is sub-wavelength. In this embodiment, the grid portion shown in FIG. 5A may be a domain having a fractional crystallinity obtained by averaging the fractional crystallinities of the individual regions 210. Construction of an element comprising a series of such domains where the average fractional crystallinity of the different domains is equal or essentially so provides for functionality with respect to reflection and/or transmission as described above in this example. With respect to domain scale embodiments, the fractional crystallinity of the domains controls the functionality and no fractional crystallinity requirement is imposed on particular active regions within a particular domain as long as the average fractional crystallinity for the domain meets the designed value. In domain scale embodiment, the different domains also need not be comprised of individual regions having corresponding fractional crystallinities. Outside of the requirement to achieve a particular domain average fractional crystallinity, any correlation or relationship on fractional crystallinity at the level of individual chalcogenide regions is optional. Achievement of a desired domain fractional crystallinity may be achieved in multistate or binary mode for the grids of this invention.

EXAMPLE 2

In this example, representative elements with beam steering capability are described. Specifically, elements with square grids similar to that described in EXAMPLE 1 are presented that provide beam steering of an incident electromagnetic beam. As discussed hereinabove and in co-pending U.S. patent application Ser. No. 10/226,828, beam steering may be achieved with an element that incorporates a continuous or discrete phase taper. In some embodiments of the instant example, a phase taper is achieved through the formation of a crystallinity gradient in the volumes of chalcogenide material distributed in one or more directions across the active regions of an element. In other embodiments, a phase taper is achieved through the formation of a crystallinity gradient over a series of domains, each of which comprises a plurality of sub-wavelength active chalcogenide regions. Non-uniformity of the structural state of the active chalcogenide regions in one or more directions across a grid provides a beam steering capability through the effect of a continuous phase taper. Corresponding embodiments utilizing a discrete phase taper, including those based on multistate or binary mode, are within the scope of the instant invention.

Figure 6:
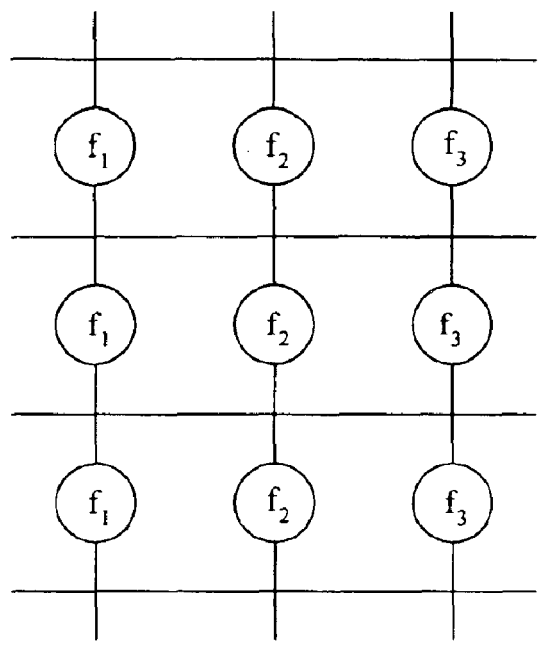
FIG. 6. An element for reflecting or transmitting electromagnetic radiation that includes a crystallinity gradient across active chalcogenide regions in a horizontal direction.

A representative example of a beam steering element according to the instant invention is depicted in FIG. 6, which shows a grid similar to the one shown in FIG. 2A where the distribution of fractional crystallinities of the volumes of chalcogenide material in the active regions is non-uniform. The lines in FIG. 6 depict conductive strips or segments and the circles depict active regions that include a volume of chalcogenide material. The active regions of the embodiment shown in FIG. 6 are located within the vertical conductive strips and interconnect two conductive segments. The fractional crystallinity of the volume of chalcogenide material in each active region depicted in FIG. 6 is signified by the label $f_1$, $f_2$ or $f_3$ in the circles that represent the active chalcogenide regions. The regions labeled $f_1$ all have the same fractional crystallinity as do the regions labeled $f_2$ and the regions labeled $f_3$ where $f_1$, $f_2$, and $f_3$ refer to different fractional crystallinities. A crystallinity gradient thus is present in a horizontal direction across the chalcogenide regions of the element shown in FIG. 6 and beam steering may occur in reflection or transmission mode.

Beam steering implies reflection in a non-specular direction or transmission in a non-refractive direction. The specific direction of beam steering relative to the specular direction of reflection or refractive direction of transmission can be established by controlling the relative ordering and magnitudes of the fractional crystallinities $f_1$, $f_2$ and $f_3$. If $f_2$ is a fractional crystallinity intermediate between $f_1$ and $f_3$, for example, the element of FIG. 6 may be used to provide beam steering with a positive or negative deviation from the specular direction of reflection or refractive direction of transmission where the direction of the deviation depends on whether $f_1>f_2>f_3$ or $f_1<f_2<f_3$ in this particular example.

Corresponding domain scale embodiments are also within the scope of the instant invention. Beam steering may be accomplished with an element having domains with fractional crystallinities that constitute a discrete phase taper. An element including, for example, a consecutive series of domains, each of which comprises a plurality of sub-wavelength active chalcogenide regions, having average fractional crystallinities of $F_1$, $F_2$, and $F_3$ where $F_1<F_2<F_3$ or $F_1>F_2>F_3$ may provide beam steering in accordance with the instant invention. Analogous embodiments having an arbitrary number of domains are also possible as are embodiments in which domain fractional crystallinity is achieved through multistate or binary mode.

Figure 7:
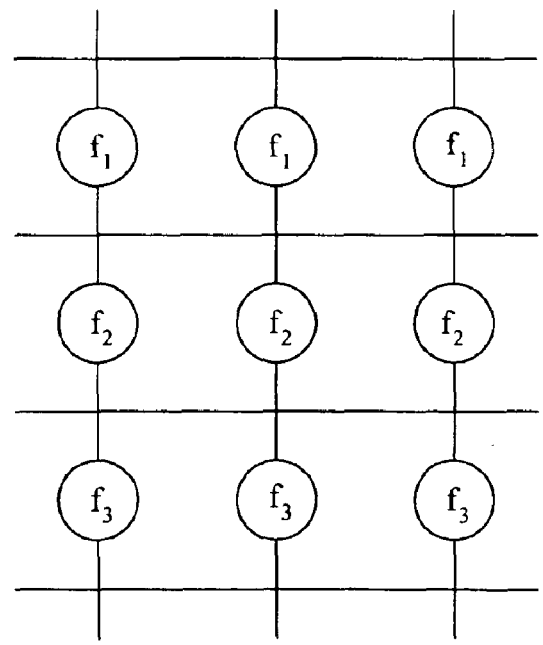
FIG. 7. An element for reflecting or transmitting electromagnetic radiation that includes a crystallinity gradient across active chalcogenide regions in a vertical direction.

Variations of the element of FIG. 6 having crystallinity gradients in the vertical, diagonal or other directions across a series of active regions or domains are also within the scope of the instant invention. FIG. 7, for example, shows an element having a crystallinity gradient in a vertical direction. Corresponding embodiments utilizing domains the exhibit a discrete phase taper in the vertical, diagonal or other directions are also within the scope of the invention. Through appropriate control and formation of continuous or discrete crystallinity gradients in one or more directions, non-specular reflection or non-refractive transmission over a wide range of angular deviations from the direction of specular reflection or direction of refractive transmission are possible and for each angular deviation, non-specular reflection or non-refractive transmission over a cone of azimuthal angles is possible. Specific directions of non-specular reflection or non-refractive transmission can be obtained by controlling the relative ordering ($f_1>f_2>f_3$ vs. $f_1<f_2<f_3$ or $F_1<F_2<F_3$ vs. $F_1>F_2>F_3$ etc.) and magnitudes of the fractional crystallinities of the active regions or domains that form a crystallinity gradient.

Figure 8:
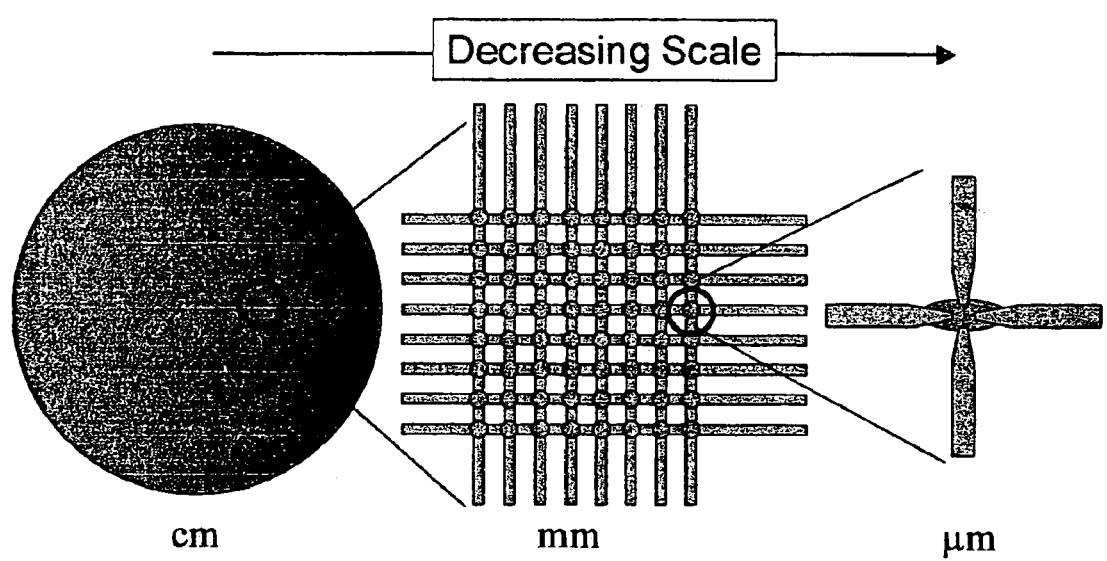
FIG. 8. An element for reflecting or transmitting electromagnetic radiation that includes active chalcogenide regions located at the intersection points of horizontal and vertical conductive strips.

An element with beam steering capability in which the active chalcogenide regions are located at the intersection points of the vertical and horizontal conductive strips is shown in FIG. 8. The element is shown in perspective on decreasing length scales ranging from the approximately centimeter (cm) length scale to the approximately micron ($\mu$m) length scale. The gray scale depiction on the centimeter length scale depicts the non-uniformity of fractional crystallinity across the element. Lighter regions may indicate a lower fractional crystallinity and darker regions may indicate a higher fractional crystallinity or vice versa. The crystallinity gradient in the element in FIG. 7 occurs in a horizontal direction and may provide a continuous phase taper or discrete phase taper. The millimeter (mm) length scale depiction is an enlargement that shows portions of the horizontal and vertical conductive strips and selected active chalcogenide regions. Although a crystallinity gradient exists in the horizontal direction, the length scale of the mm scale depiction is such that the variation in fractional crystallinity is small and not necessarily readily discernible from the gray scale representation of the active chalcogenide regions. The mm scale depiction corresponds approximately with the size of a wavelength scale domain for incident electromagnetic radiation in the terahertz frequency range and is an example of a square domain that includes a plurality of sub-wavelength active chalcogenide regions in accordance with the instant invention for terahertz frequency radiation. In the embodiment of FIG. 8, it is evident that the millimeter scale domain fractional crystallinity varies significantly in the horizontal direction. The $\mu$m scale depiction is a further enlargement that illustrates a single active chalcogenide region along with its contacts with segments of the vertical and horizontal conductive strips. The active regions of this embodiment interconnect four conductive segments, two each from within the horizontal and vertical conductive strips.

The grids of this example can be used as free standing grids, grids supported by a substrate or dielectric, or grids interposed between two or more dielectrics.

EXAMPLE 3

In this example, additional elements with beam steering capability are described. More specifically, elements capable of focusing or defocusing incident electromagnetic radiation in reflection or transmission mode are described. Focusing and defocusing effects may be achieved by establishing a crystallinity gradient, over individual active chalcogenide regions or domains comprising a plurality of sub-wavelength chalcogenide regions, in which the variation of fractional crystallinity is non-uniform in one or more directions across the chalcogenide regions or domains of an element. A crystallinity gradient in a particular direction, for example, having portions over which the fractional crystallinity increases and other portions over which the fractional crystallinity decreases may provide focusing or defocusing.

Figure 9:
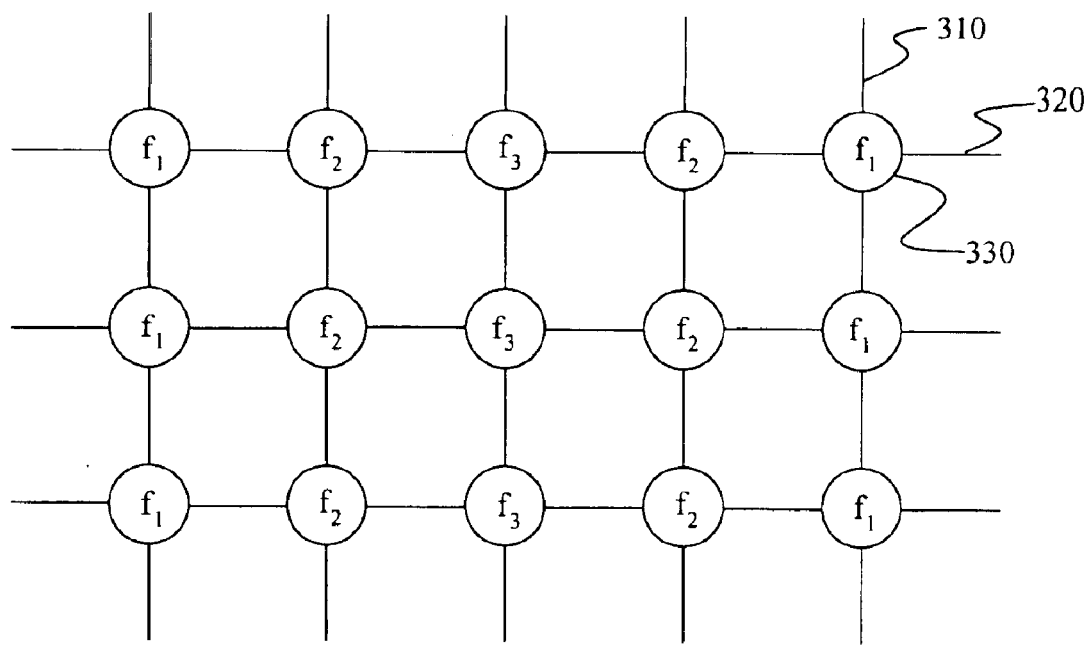
FIG. 9. An element for reflecting or transmitting electromagnetic radiation that includes a crystallinity gradient across active chalcogenide regions in a horizontal direction over which the fractional crystallinity increases and decreases.

FIG. 9 shows an embodiment of an element that can be used to symmetrically focus or defocus an incident electromagnetic beam in one direction. The element includes vertical conductive strips 310, horizontal conductive strips 320 and active regions 330 that include a volume of chalcogenide material at the intersection points of the horizontal and vertical conductive strips. The fractional crystallinities of the active chalcogenide regions are labeled $f_1$, $f_2$ and $f_3$. The regions labeled $f_1$ all have the same fractional crystallinity as do the regions labeled $f_2$ and the regions labeled $f_3$ where $f_1$, $f_2$, and $f_3$ refer to different fractional crystallinities and $f_2$ is an intermediate value between $f_1$ and $f_3$. A crystallinity gradient is thus present in a horizontal direction across the chalcogenide regions of the element in which the fractional crystallinity decrease in one portion and increases in another portion. If $f_1>f_2>f_3$, for example, the fractional crystallinity decreases from the left side of the element toward the center and increases from the center of the element toward the right side. If $f_1<f_2<f_3$, the fractional crystallinity increases from the left side of the element toward the center and decreases from the center toward the right side of the element. Since it is possible to configure the grid such that $f_1>f_2>f_3$ or $f_1<f_2<f_3$, the element of FIG. 9 can focus or defocus an incident electromagnetic beam. The focusing or defocusing can occur in reflection, transmission or partially in reflection and partially in transmission where frequencies and bandwidths associated with optimal reflection or transmission are determined by the overall capacitive, inductive, conductive, and susceptance effects of the grid. These properties can be controlled by controlling the grid capacitance, chalcogenide conductivity, grid inductance, choice of dielectric materials, width, shape and separation of conductive strips or segments, size, shape, number of active chalcogenide regions etc. within the grid.

The focusing or defocusing provided by the element of FIG. 9 occurs in the horizontal direction since the crystallinity gradient extends in the horizontal direction. Focusing or defocusing in the vertical direction may be achieved by configuring the structural states of the active chalcogenide regions so that a crystallinity gradient is present in the vertical direction. Crystallinity gradients in non-vertical and non-horizontal directions can similarly be formed to provide focusing or defocusing in arbitrary directions. Focusing or defocusing in more than one direction may also be achieved by providing appropriate crystallinity gradients in more than one direction. Crystallinity gradients can also be formed that provide for focusing or defocusing in combination with non-specular reflection or non-refractive transmission.

Analogous elements to the embodiment of FIG. 9 based on corresponding discrete phase tapers based on multistate or binary programming of fractional crystallinity are also within the scope of the instant invention. These embodiments use grids comprised of domains including a plurality of sub-wavelength chalcogenide region where the average fractional crystallinity of a set of domains is patterned or arranged, for example, in the manner of FIG. 9. Focusing and defocusing may generally be achieved with a series of domains where the domain fractional crystallinity increases and subsequently decreases (or vice versa) in one or more directions of an element. Although the embodiment of FIG. 9 shows a pattern of increasing and decreasing fractional crystallinity over a set of five active regions or domains, it is evident that the principle of focusing and defocusing extends generally to an arbitrary number of active regions or domains showing the trend exemplified in the embodiment shown in FIG. 9.

The phenomena underlying focusing, defocusing, non-specular reflection and non-refractive transmission is the phase angle variation of the active chalcogenide regions or domains across the element. More specifically, the phase angle differential between the volumes of chalcogenide materials in adjacent active regions or domains in a crystallinity gradient is relevant to determining the extent to which focusing, defocusing, non-specular reflection and non-refractive transmission occur. Specular reflection and refractive transmission occur when no phase angle differential is present between adjacent chalcogenide regions or domains in an element. In practice, this condition is achieved by configuring the chalcogenide regions to the same structural state so that the fractional crystallinity is uniform across the grid and no crystallinity gradient is present. (The corresponding condition for specular reflection and refractive transmission for discrete phase tapers is uniformity of domain fractional crystallinity.) Non-specular reflection and non-refractive transmission require the presence of a crystallinity gradient so that a phase taper is present in one or more directions across the chalcogenide regions or domains of the grid. A phase taper implies a differential in phase angle between adjacent chalcogenide regions or domains in the direction of the crystallinity gradient. If the phase angle differential is constant (in magnitude and sign) between adjacent chalcogenide regions or domains over the crystallinity gradient, non-specular reflection and/or non-refractive transmission occur. Focusing or defocusing occurs when the phase angle differential between adjacent elements is not constant across a crystallinity gradient.

Figure 10:
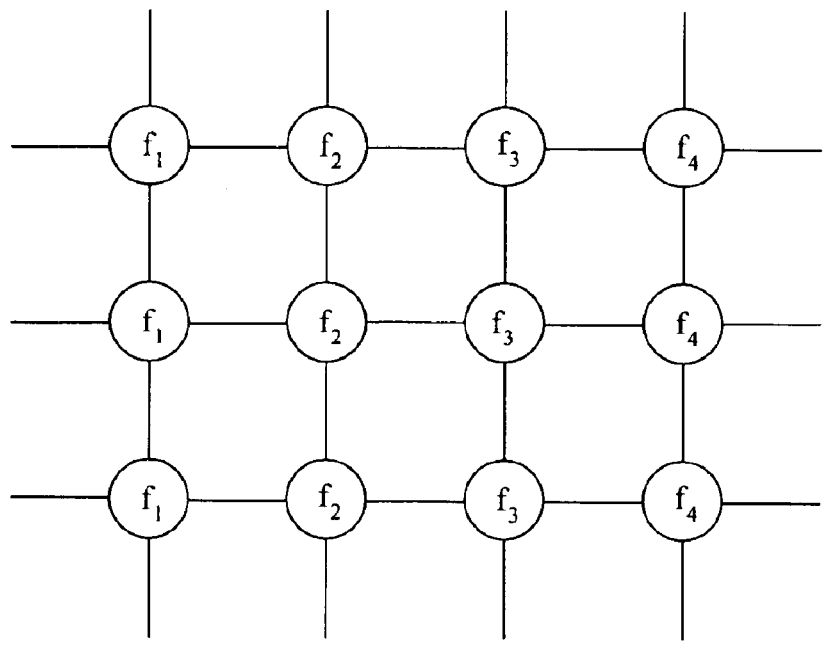
FIG. 10. An element for reflecting or transmitting electromagnetic radiation that includes a crystallinity gradient over active chalcogenide regions in a horizontal direction.

Crystallinity gradients, such as that shown in the embodiment of FIG. 9 and the domain analog thereof, having portions over which the fractional crystallinity increases and portions over which the fractional crystallinity decreases are examples of crystallinity gradients having a non-constant phase angle differential between adjacent chalcogenide regions. Such gradients may provide focusing or defocusing. Focusing or defocusing may also be achieved with crystallinity gradients over which the fractional crystallinity only increases or only decreases where the magnitude of the phase angle differential is non-constant between adjacent chalcogenide regions or domains. An example of an element having such a crystallinity gradient is provided in FIG. 10 which includes vertical and horizontal conductive strips (depicted as lines) and chalcogenide regions (depicted as circles and labeled according to fractional crystallinity) where $f_1$, $f_2$, $f_3$ and $f_4$ refer to specific values of fractional crystallinities and the fractional crystallinities are such that the phase angle differential between adjacent chalcogenide regions in the rightward horizontal direction is either increasing or decreasing where the magnitude of the differential phase angle between elements having fractional crystallinities $f_1$ and $f_2$ is less than the magnitude of the differential phase angle between elements having fractional crystallinities $f_2$ and $f_3$ is less than the magnitude of the differential phase angle between elements having fractional crystallinities $f_3$ and $f_4$. Corresponding principles underlie elements based on domains comprising a plurality of sub-wavelength chalcogenide regions. In domain embodiments, focusing or defocusing may occur where a non-constant differential in fractional crystallinity is present between adjacent domains of the element. A non-constant differential in fractional crystallinity may be achieved through multi-state or binary programming of the active chalcogenide regions within the domains.

An additional aspect of focusing or defocusing elements is beam shaping, an effect that describes the influence of a focusing or defocusing element on the cross-sectional shape or dimensions of an incident electromagnetic beam. The element of FIG. 9, for example, modifies the shape of an incident electromagnetic beam through a focusing or defocusing in the direction of the crystallinity gradient. A beam incident to the element of FIG. 9 having a circular cross-section, for example, will be focused or defocused along its horizontal axis to provide a reflected or transmitted beam having an elliptical cross-section. If the element of FIG. 9 is configured to focus, the horizontal diameter of the reflected or transmitted beam will be smaller than the vertical diameter and vice versa if the element of FIG. 9 is configured to defocus. A corresponding focusing or defocusing in the vertical direction can be obtained with an element having the crystallinity gradient of the element of FIG. 9 in the vertical direction. Crystallinity gradients in more than one dimension provide focusing or defocusing effects in more than one direction. A crystallinity gradient that is symmetrical about a point or line within an element provides a symmetrical focusing or defocusing effect in one or more directions. The crystallinity gradient shown in FIG. 9, for example, is symmetrical about a vertical line passing through the chalcogenide regions having fractional crystallinities $f_3$. As a result, the resulting focusing or defocusing in the horizontal direction is symmetric. This is why an incident electromagnetic beam having a circular cross-section and incident upon the element of FIG. 9 is reflected or transmitted as an elliptical beam that is elongated or compressed symmetrically in the horizontal direction relative to the vertical direction.

Non-symmetric focusing or defocusing is also within the scope of the instant invention and may be achieved by configuring the fractional crystallinities of the chalcogenide elements in such a way that crystallinity gradients are present that are not symmetrical with respect to a point or line within the grid. As an example of such an element, one can consider the element depicted in FIG. 6 where $f_1$, $f_2$ and $f_3$ are unequal and $f_2$ is either larger than both of $f_1$ and $f_3$ or smaller than both of $f_1$ and $f_3$. Such an element has a crystallinity gradient in the horizontal direction that includes portions over which the fractional crystallinity gradient increase and portions over which the fractional crystallinity decreases, but is not symmetric about the line including chalcogenide regions having fractional crystallinities $f_2$ since $f_1$ and $f_3$ are unequal. Such an element provides non-symmetric focusing along the horizontal cross-sectional direction of an incident beam. An incident beam having a circular cross-section, for example, may be reflected or transmitted into a round beam having a cross-section with different curvatures on the left and right sides. Analogous embodiments of non-symetrically focusing grids that include domains comprising a plurality of sub-wavelength chalcogenide regions are also within the scope of the instant invention. Further discussion of focusing, defocusing and beam shaping is provided in co-pending U.S. patent application Ser. No. 10/226,828.

The grids of this invention can be used as free standing grids, grids supported by a substrate or dielectric, or grids interposed between two or more dielectrics.

EXAMPLE 4

In this example, other embodiments of elements representative of the range of positions and distributions of active chalcogenide regions within a grid or domain are described. The elements discussed in EXAMPLE 1 include a square grid with active chalcogenide regions in series with vertical conductive strips in a grid or domain. Other placements or patterns of chalcogenide regions within a grid or domain are possible. Embodiments in which the chalcogenide regions are in series with the horizontal conductive strips or where chalcogenide regions are in series with vertical and horizontal conductive strips (e.g. the embodiments of FIGS. 9, 10, and 11) are within the scope of the instant invention. Embodiments in which chalcogenide regions are selectively distributed in series with less than all of the horizontal or vertical conductive strips of a grid or domain are also within the scope of the instant invention.

Representative distributions or patterns of chalcogenide regions within a square grid or domain are illustrated in FIGS. 11A–11F. The lines in FIGS. 11A–11F depict horizontal and vertical conductive strips and the circles depict regions of chalcogenide material. As in all embodiments of the instant invention, the depiction of chalcogenide regions with a circular shape is not intended to limit the shape of the chalcogenide regions in the instant elements. Chalcogenide regions having any shape are in accordance with the instant invention.

Figure 11A:
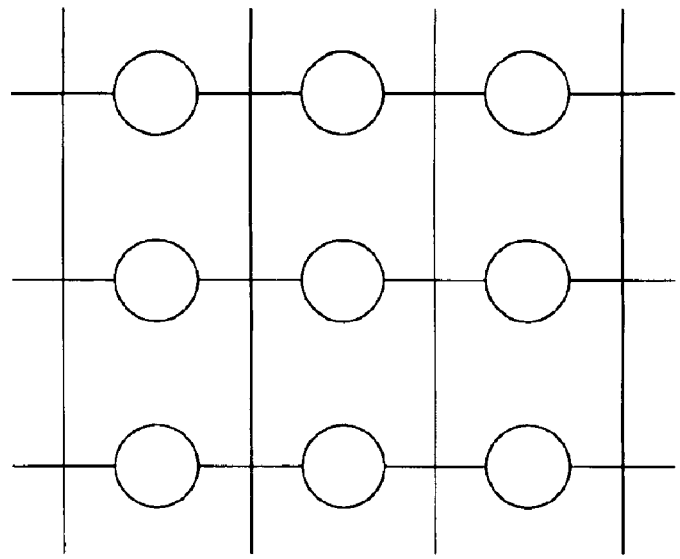
FIG. 11A. An element for reflecting or transmitting electromagnetic radiation that includes active chalcogenide regions that interconnect horizontal conductive segments.
Figure 11B:
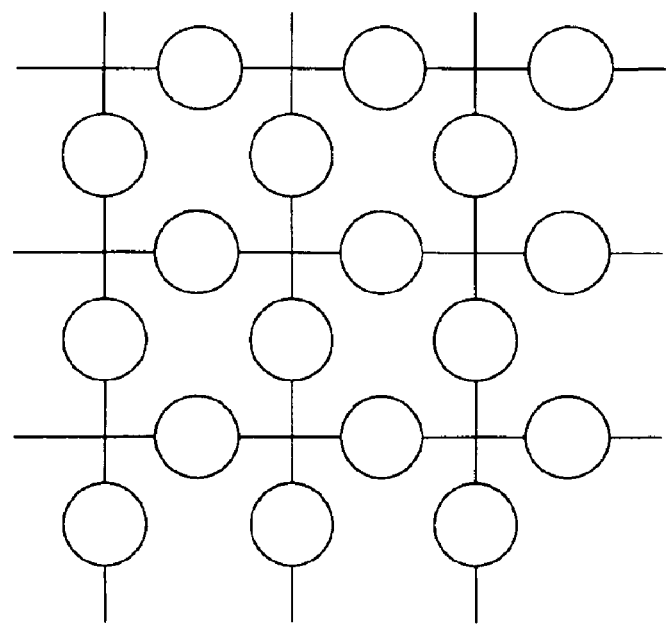
FIG. 11B. An element for reflecting or transmitting electromagnetic radiation that includes active chalcogenide regions that interconnect horizontal and vertical conductive segments.
Figure 11C:
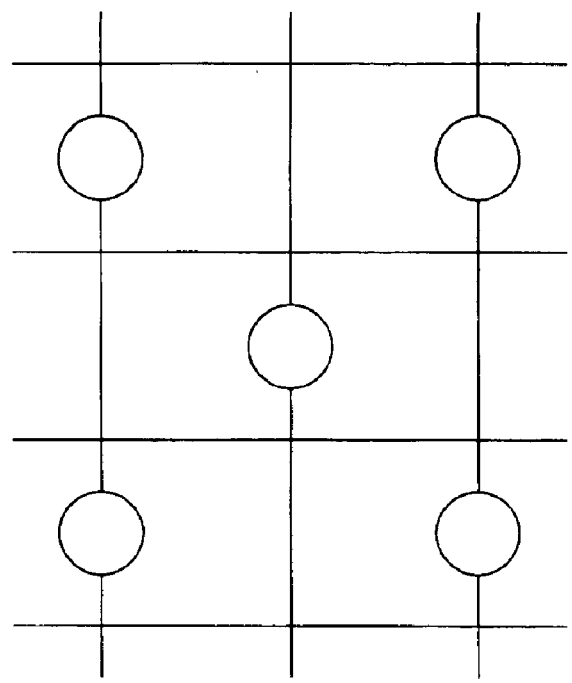
FIG. 11C. An element for reflecting or transmitting electromagnetic radiation that includes active chalcogenide regions that interconnect conductive segments at selected positions within the vertical conductive strips.
Figure 11D:
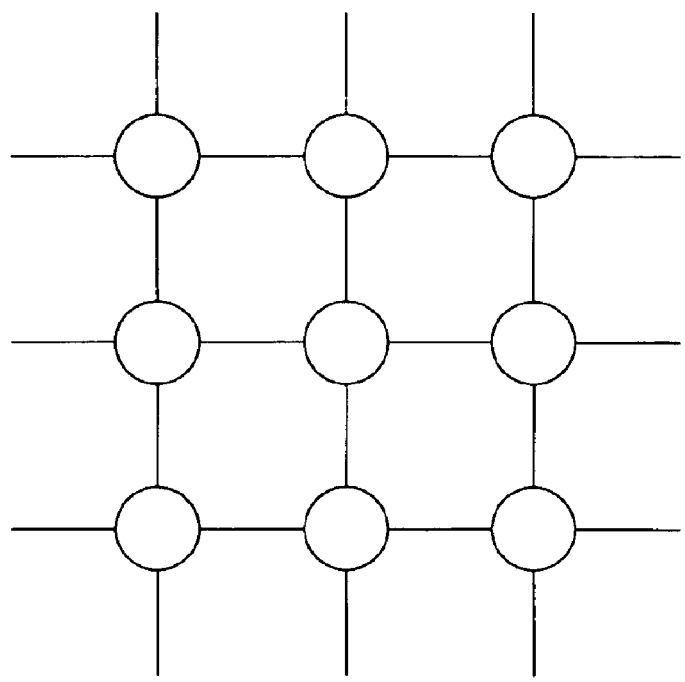
FIG. 11D. An element for reflecting or transmitting electromagnetic radiation that includes active chalcogenide regions located at the intersection point of horizontal and vertical conductive strips.

FIG. 11A shows a square grid or domain in which the active chalcogenide regions are in series with the horizontal conductive strips. In this embodiment, each chalcogenide region interconnects two conductive segments within the horizontal conductive strips. FIG. 11B shows a square grid or domain in which the active chalcogenide regions are in series with horizontal and vertical conductive strips. In this embodiment, each chalcogenide region interconnects two conductive segments within either the vertical or horizontal strips. FIG. 11C shows a square grid or domain in which the chalcogenide regions are selectively distributed within the vertical conductive strips where each active chalcogenide region interconnects two conductive segments. A similar distribution of chalcogenide regions with respect to the horizontal conductive strips of the grid or domain is also possible. FIG. 11D shows a square grid or domain in which the chalcogenide regions are positioned at the intersection points of horizontal and vertical conductive strips. In this embodiment, the active chalcogenide regions interconnect four conductive segments. Similar patterns in which chalcogenide regions are located at selected intersection points of the vertical and horizontal conductive strips are also possible.

Figure 11E:
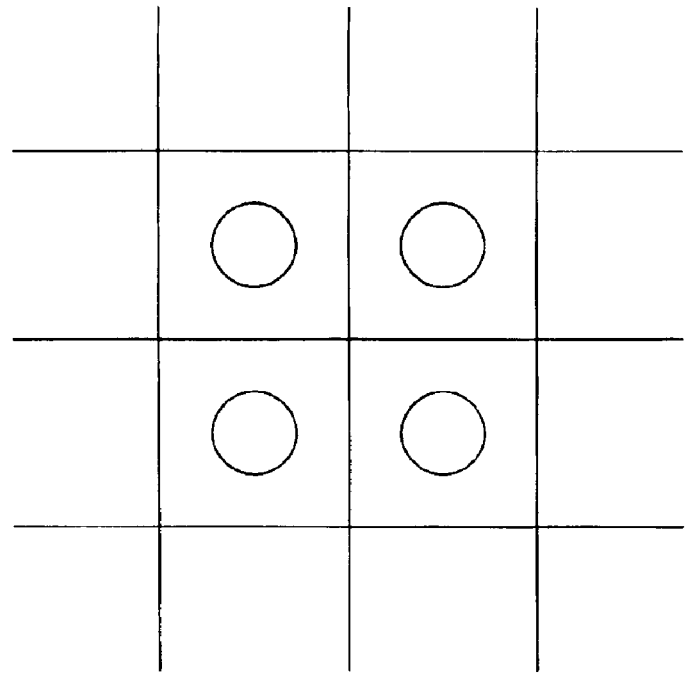
FIG. 11E. An element for reflecting or transmitting electromagnetic radiation that includes active chalcogenide regions interposed between intersecting conductive strips.
Figure 11F:
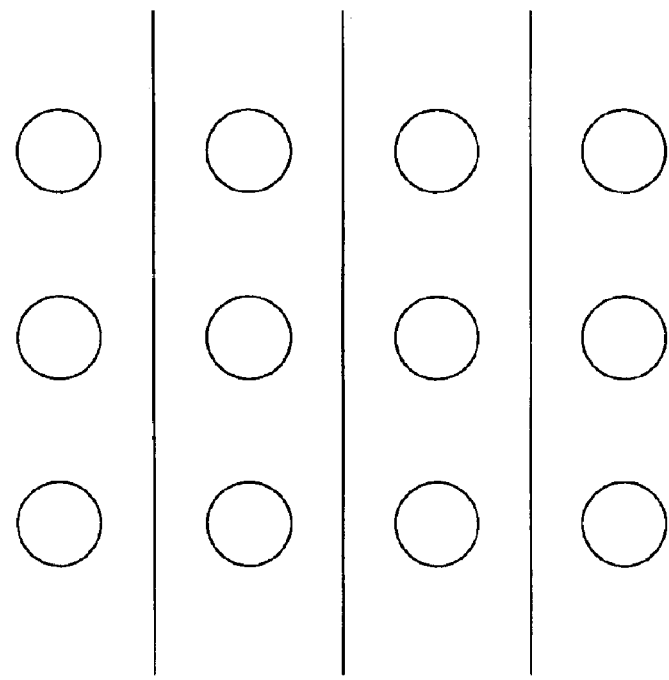
FIG. 11F. An element for reflecting or transmitting electromagnetic radiation that includes active chalcogenide regions interposed between non-intersecting conductive strips.

Embodiments in which some active chalcogenide regions interconnect two conductive segments and other active chalcogenide regions interconnect four conductive segments are also within the scope of the instant invention. Chalcogenide regions may also be distributed between the conductive strips of the grid or domain as shown in FIGS. 11E and 11F. Even though the chalcogenide regions of the embodiments of FIGS. 11E and 11F are interposed between and not directly connected to the conductive strips, the chalcogenide regions are nonetheless dielectric regions that influence the overall capacitive reactance of the grid or domain. Embodiments that combine interposed and directly connected chalcogenide regions are also within the scope of the instant invention.

Each of the embodiments depicted in FIGS. 11A–11F provides a distinct combination of inductive, capacitive, resistance, and susceptance effects to incident electromagnetic radiation and each can be modeled by an equivalent circuit that possesses capacitive, inductive, resistive, conductive etc. components that may be used to predict the dispersive effects of the grid as well as the frequencies of optimal performance in reflection, transmission, wavefront correction or focusing/defocusing mode. Each of the embodiments is reconfigurable as discussed in EXAMPLE 1 through variations in the fractional crystallinity across the active chalcogenide regions of the grid. Varying degrees of efficiency in reflection or transmission mode are achievable over various frequency ranges and polarizations of incident electromagnetic radiation. Each of the embodiments described in this invention may be used as a free-standing grid or domain, a grid or domain supported by a dielectric or a grid interposed between two or more dielectrics. Each of the embodiments described in this example can have active chalcogenide regions configured to provide a crystallinity gradient or absence thereof in one or more directions and may also be configured to provide one or more of non-specular reflection, non-refractive transmission, focusing, or defocusing through the presence of a continuous or discrete phase taper. The grids of this example may also define or be contained within domains comprising a plurality of sub-wavelength chalcogenide regions.

EXAMPLE 5

In this example, representative examples of non-square grid or domain geometries are described. In addition to square grids of conductive strips or square domains such as those shown in the examples above, the instant invention includes elements with grids having conductive strips forming non-square shapes and domains having non-square shapes. Representative examples include rectangular grids or domains, triangular grids or domains, hexagonal grids or domains, and diamond grids or domains. Each of these embodiments has a unit cell of the indicated shape and includes periodic grids or domains that may be viewed as a replication of that unit cell in one or more directions. Elements including periodic grids or domains having non-regular, curved or arbitrarily shaped unit cells are also within the scope of the instant invention. Periodic grids or domains may be characterized by a periodic spacing, where the periodic spacing is a repeat distance that is characteristic of the shape of the unit cell of the grid or the shape of the domain. A periodic spacing may correspond to a side length of a unit cell or domain, the distance between a pair of parallel sides of a unit cell or domain, etc. Grids, periodic or non-periodic, with intersecting, non-intersecting or a combination of intersecting and non-intersecting conductive strips are also within the scope of the instant invention.

As in the square element embodiments of the instant invention, the chalcogenide regions of the non-square element embodiments may be located in series with one or more sets of conductive strips, may be located at the intersection points of one or more sets of conductive strips, or may be interposed between conductive strips. As in the square embodiments of the instant invention, the active chalcogenide regions of the non-square embodiments may be also configured to have uniform fractional crystallinity or crystallinity gradients in one or more directions so that specular reflection, refractive transmission, non-specular reflection, non-refractive transmission, focusing or defocusing may be achieved.

EXAMPLE 6

In this example, embodiments of elements having grids with conductive strips of various shapes are described. The conductive strips of the elements of the instant invention may be formed of a conductive material and shaped in the form of round or flat wires or leads. In addition to conductive strips having uniform length, width and/or diameter dimensions (e.g. FIG. 1A), the conductive strips or segments of the instant invention may have arbitrary shapes with non-uniform widths along their length. Conductive strips or segments having uniform widths along their lengths, but where the width is different for different strips or segments are also within the scope of the instant invention.

The shape, size, separation etc. of the conductive strips influence the capacitive and inductive reactances of the instant grids and represent design parameters that may be used to tailor the performance of the instant elements to particular frequencies or bands of incident electromagnetic radiation. The particularities of the shapes of the conductive strips permit fine-tuning of the contribution of the conductive strips to the overall capacitive and inductive reactances of the instant grids. The shape of the contacts of conductive strips or segments and their extent of spatial overlap with the chalcogenide regions provides additional control over the overall capacitive and inductive reactances of the instant grids.

Figure 12A:
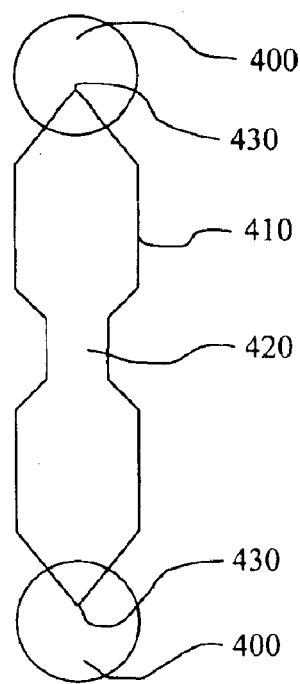
FIG. 12A. A conductive segment having a non-uniform width.
Figure 12B:
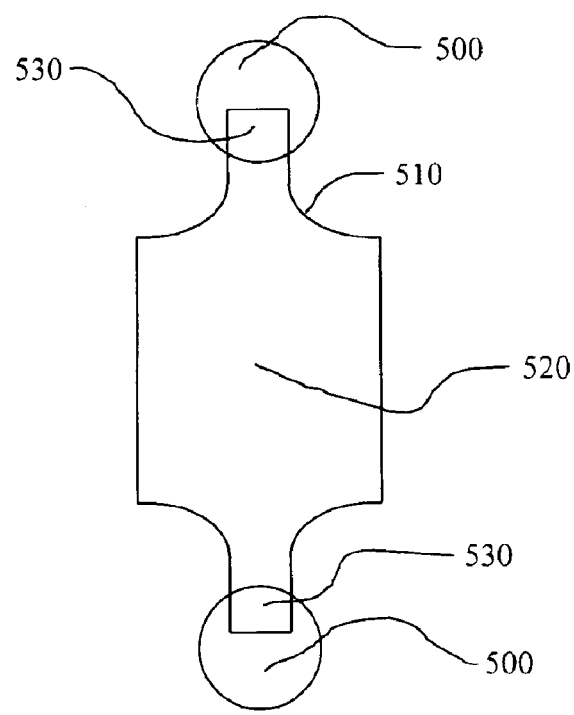
FIG. 12B. A conductive segment having a non-uniform width.

Some representative examples of conductive strips having non-uniform widths are shown in FIGS. 12A and 12B. FIG. 12A includes chalcogenide regions 400, conductive segment 410 having a narrow portion 420 and tapered contacts 430 with the chalcogenide regions. The narrowing of the conductive segment constricts current flow through the conductive segment and contributes to an increase in the inductance of the conductive strips. FIG. 12B includes chalcogenide regions 500, conductive segment 510 having a wide portion 520 and flat contacts 530 with the chalcogenide regions. Widening of portions of conductive strips or segments promotes current flow and contributes to a decrease in the inductance of the conductive strips. The length direction of the conductive segments of this example is the direction that connects the two active chalcogenide regions. As can be seen from FIGS. 12A and 12B, the width of the conductive segments of this example are non-uniform in the length direction. Arbitrarily shaped conductive segments or strips are within the scope of the instant invention as are embodiments in which the grid includes two or more shapes of conductive strips or segments.

EXAMPLE 7

In this example, elements including a combination of grids are described. The individual grids within the scope of the instant invention may be combined to form multi-grid elements providing further degrees of control over the reflection or transmission of incident electromagnetic radiation. Multiple grids may act in concert with one another to reinforce, cancel or otherwise mutually influence each other. Grids may provide fractional crystallinity gradients resulting from continuous or discrete phase tapers.

Figure 13:
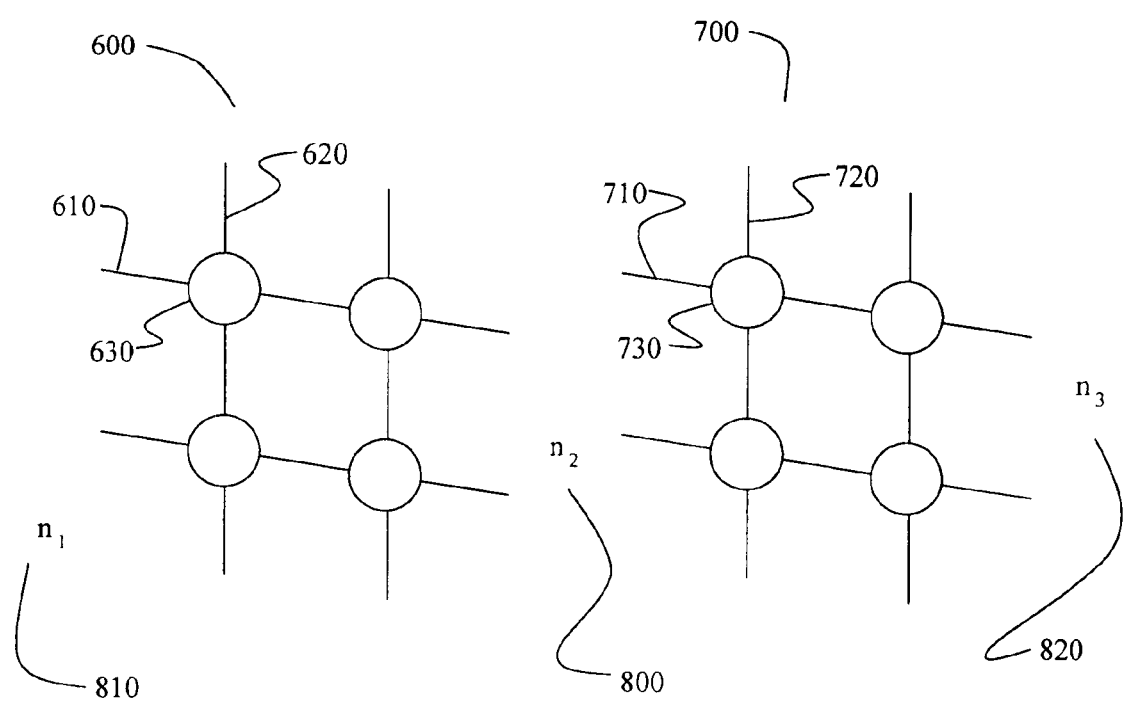
FIG. 13. A grid combination for reflecting or transmitting electromagnetic radiation.

A representative element based on a grid combination is depicted in FIG. 13, which shows a grid 600 with horizontal conductive strips 610, vertical conductive strips 620 and chalcogenide regions 630; a grid 700 with horizontal conductive strips 710, vertical conductive strips 720, and chalcogenide regions 730; a dielectric 800 having a refractive index $n_2$ interposed between grids 600 and 700; and surrounding dielectrics 810 and 820 having refractive indices $n_2$ and $n_3$. The grid combination of this embodiment forms a Fabry-Perot-like cavity that can be used to improve the transmission efficiency of incident electromagnetic radiation. More specifically, at a frequency that depends on the grid impedances and reactances and the thickness and properties of the interposed dielectric, a cavity resonance occurs that provides a transmission bandpass having a frequency of optimum transmission at which the transmission efficiency is essentially 100%, assuming no losses in the element. In typical elements, some loss is present, but the transmission efficiency can be designed to remain high and close to 100%. The resonance of lowest frequency occurs near the frequency for which the two grids are separated by an interposed dielectric having a thickness equal to about one quarter of the wavelength of the incident electromagnetic radiation. Optimum transmission is expected when the chalcogenide regions of the grids are configured to eliminate or minimize the capacitive reactance of the grids. As a result, optimum transmission is expected when the chalcogenide regions are in a conductive, fully crystalline state.

Obvious variations of the embodiment depicted in FIG. 13 are also within the scope of the instant invention. Non-square grids, grids including non-square domains, conductive strips of various shapes and thicknesses, grids having crystallinity gradients, grids having chalcogenide regions at locations other than the intersection points of conductive strips etc. may be used in multi-grid combinations.

The disclosure and discussion set forth herein is illustrative and not intended to limit the practice of the instant invention. Numerous equivalents and obvious and foreseeable variations thereof are envisioned to be within the scope of the instant invention. It is the following claims, including all equivalents, in combination with the foregoing disclosure, which define the scope of the instant invention.

We claim:

1. An element for reflecting or transmitting electromagnetic radiation comprising:

a grid of conductive strips and a plurality of active regions, each of said active regions comprising a volume of chalcogenide material, said chalcogenide material having an amorphous state and a crystalline state, each of said active regions having a plurality of structural states, said structural states differing in the fractional crystallinity of said volume of chalcogenide material;

wherein said element receives incident electromagnetic radiation and modifies its phase to produce reflected or transmitted electromagnetic radiation.

2. The element of claim 1, wherein said grid of conductive strips includes intersecting conductive strips.

3. The element of claim 2, wherein said active regions are positioned at the intersection point of said intersecting conductive strips.

4. The element of claim 1, wherein said grid of conductive strips is periodic, said periodic grid having a periodic spacing in one or more directions.

5. The element of claim 4, wherein said periodic grid is a square or rectangular grid.

6. The element of claim 4, wherein said periodic grid is a triangular, hexagonal or diamond grid.

7. The element of claim 4, wherein said periodic spacing is no greater than the wavelength of said incident electromagnetic radiation.

8. The element of claim 1, wherein said conductive strips include conductive segments, said active regions interconnecting said conductive segments, each of said interconnecting active regions interconnecting at least two of said conductive segments.

9. The element of claim 8, wherein each of said interconnecting active regions interconnects at least three of said conductive segments.

10. The element of claim 1, wherein the width of each of said conductive strips is non-uniform.

11. The element of claim 10, wherein said non-uniform conductive strips include conductive segments interconnected by said active regions and said non-uniformity of width occurs in said conductive segments.

12. The element of claim 1, wherein the width of each of said conductive strips is uniform and said grid includes conductive strips having two or more widths.

13. The element of claim 1, wherein said active regions are interposed between two or more of said conductive strips.

14. The element of claim 1, wherein said active regions are periodically positioned within said element.

15. The element of claim 1, wherein said active regions are sub-wavelength, said sub-wavelength active regions having at least one cross-sectional dimension that is less than the wavelength of said incident electromagnetic radiation.

16. The element of claim 1, wherein said plurality of active regions includes at least three of said structural states.

17. The element of claim 1, wherein at least one of said active regions is in a partially crystalline state.

18. The element of claim 1, wherein said plurality of active regions includes a crystallinity gradient, said crystallinity gradient extending over at least two of said discrete active regions, said active regions within said crystallinity gradient including at least two of said structural states.

19. The element of claim 18, wherein said element includes at least two of said crystallinity gradients.

20. The element of claim 19, wherein said crystallinity gradients extend in at least two non-parallel directions.

21. The element of claim 1, wherein said element includes domains, each of said domains comprising two or more of said active regions, said domains forming a discrete phase taper.

22. The element of claim 21, wherein said domains form a discrete phase taper in two or more directions.

23. The element of claim 21, wherein said domains are sub-wavelength domains.

24. The element of claim 21, wherein said sub-wavelength domains are substantially non-diffracting.

25. The element of claim 21, wherein said domains are of substantially the same size.

26. The element of claim 21, wherein said domains are square.

27. The element of claim 21, wherein said domains are contiguous.

28. The element of claim 21, wherein said domains are periodically arranged in said element.

29. The element of claim 21, wherein said two or more of said active regions within said domains are arranged periodically within said domains.

30. The element of claim 1, wherein said element has a dimension that is at least twice the wavelength of said incident electromagnetic radiation.

31. The element of claim 30, wherein said dimension of said element is no greater than quintuple the wavelength of said incident electromagnetic radiation.

32. The element of claim 1, wherein said incident electromagnetic radiation has a frequency in the terahertz range.

33. The element of claim 1, wherein said reflected or transmitted electromagnetic radiation is directed in a non-specular direction or a non-refractive direction.

34. The element of claim 1, wherein said reflected or transmitted electromagnetic radiation is focused or defocused.

35. The element of claim 1, wherein said chalcogenide material comprises Te or Se.

36. The element of claim 35, wherein said chalcogenide material further includes a chemical element selected from the group consisting of In, Ag, Sb, and Ge.

37. The element of claim 1 further comprising a dielectric substrate, wherein said element is supported by said dielectric substrate.

38. The element of claim 1 further comprising a first and second dielectric material, wherein said element is interposed between said first and second dielectric materials.

39. A grid combination for reflecting or transmitting electromagnetic radiation, said combination comprising:

a first element for reflecting or transmitting electromagnetic radiation, a second element for reflecting or transmitting electromagnetic radiation, and a dielectric material;

wherein said first and second elements are elements according to claim 1 and said dielectric material is interposed between said first and second elements.

* * * * *